United States Patent
Hori et al.

(10) Patent No.: US 9,501,249 B2
(45) Date of Patent: Nov. 22, 2016

(54) PRINTING APPARATUS AND PRINT CONTROL METHOD CONTROLLING PRINTING BASED ON MEASURED DETECTION PATTERN

(71) Applicant: CANON KABUSHIKI KAISHA, Tokyo (JP)

(72) Inventors: Shinjiro Hori, Yokohama (JP); Nobutaka Miyake, Yokohama (JP); Junichi Nakagawa, Tokyo (JP); Hiromitsu Akiba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/807,631

(22) Filed: Jul. 23, 2015

(65) Prior Publication Data

US 2016/0034230 A1  Feb. 4, 2016

(30) Foreign Application Priority Data

Jul. 30, 2014  (JP) ................. 2014-154963

(51) Int. Cl.
*G06F 3/12*  (2006.01)
*G06K 15/16*  (2006.01)
*G06K 15/02*  (2006.01)

(52) U.S. Cl.
CPC .......... *G06F 3/1208* (2013.01); *G06F 3/1253* (2013.01); *G06K 15/16* (2013.01); *G06K 15/189* (2013.01); *G06K 15/1881* (2013.01); *G06K 15/1806* (2013.01)

(58) Field of Classification Search
None
See application file for complete search history.

(56) References Cited

U.S. PATENT DOCUMENTS

| 2005/0206950 A1 | 9/2005 | Ushiro | |
| 2014/0139853 A1* | 5/2014 | Goto | H04N 1/40018 358/1.9 |
| 2014/0285851 A1* | 9/2014 | Kawamoto | G06K 15/1881 358/3.09 |

FOREIGN PATENT DOCUMENTS

JP  2010-274483  12/2010

OTHER PUBLICATIONS

U.S. Appl. No. 14/807,640, filed Jul. 23, 2015.
U.S. Appl. No. 14/807,649, filed Jul. 23, 2015.

* cited by examiner

*Primary Examiner* — Andrew H Lam
(74) *Attorney, Agent, or Firm* — Fitzpatrick, Cella, Harper & Scinto

(57) ABSTRACT

There is provided a printing apparatus that conveys a print medium and performs printing on the conveyed print medium, the printing apparatus including a print data generation unit configured to generate print data by performing predetermined pseudo halftone processing of image data to be printed for quantizing the image data; a pattern data generation unit configured to generate print data on a detection pattern by performing the same predetermined pseudo halftone processing of data on the detection pattern for quantizing the data on the detection pattern; a pattern printing unit configured to print a detection pattern based on the generated print data on the detection pattern; a measuring unit configured to measure the printed detection pattern; and a print control unit configured to control printing based on the print data generated for the image data, based on a measurement result of the detection pattern.

12 Claims, 19 Drawing Sheets

PRINTING APPARATUS AND PRINT CONTROL METHOD CONTROLLING PRINTING BASED ON MEASURED DETECTION PATTERN

BACKGROUND OF THE INVENTION

Field of the Invention

The present invention relates to a printing apparatus and a print control method, and more particularly, to a technique of detecting a predetermined pattern printed on a conveyed print medium to acquire an amount of conveyance of the print medium and the like.

Description of the Related Art

Japanese Patent Laid-Open No. 2010-274483 discloses printing, in a predetermined position of a print medium, a cross pattern formed of a plurality of dots as a predetermined pattern for detection. It is preferable that this pattern be printed in a color tone that does not affect the quality of a printed image. According to print medium conveyance control having such a configuration as disclosed in Japanese Patent Laid-Open No. 2010-274483, it is possible to convey a print medium to a target position in the conveyance by using a result of detection of the pattern in a fixed position.

However, as disclosed in Japanese Patent Laid-Open No. 2010-274483, even with consideration of the color tone of the pattern that does not affect the quality of a printed image, this may not be sufficient. More specifically, in Japanese Patent Laid-Open No. 2010-274483, since a pattern is printed independently of the arrangement of dots forming an image to be printed, the pattern may be visually identified in the printed image depending on the density of the image or the printing position of the pattern. This may lead to a poor image quality.

SUMMARY OF THE INVENTION

An object of the present invention is to provide a printing apparatus and a print control method capable of printing a detection pattern used in print control, which cannot be easily viewed in an image printed on a print medium.

In a first aspect of the present invention, there is provided a printing apparatus that conveys a print medium and performs printing on the conveyed print medium, the printing apparatus comprising: a print data generation unit configured to generate print data by performing predetermined pseudo halftone processing of image data to be printed for quantizing the image data; a pattern data generation unit configured to generate print data on a detection pattern by performing the same predetermined pseudo halftone processing of data on the detection pattern for quantizing the data on the detection pattern; a pattern printing unit configured to print a detection pattern based on the generated print data on the detection pattern; a measuring unit configured to measure the printed detection pattern; and a print control unit configured to control printing based on the print data generated for the image data, based on a measurement result of the detection pattern.

In a second aspect of the present invention, there is provided a print control method of conveying a print medium and performing printing on the conveyed print medium, the print control method comprising: a print data generation step of generating print data by performing predetermined pseudo halftone processing of image data to be printed for quantizing the image data; a pattern data generation step of generating print data on a detection pattern by performing the same predetermined pseudo halftone tone processing of data on the detection pattern for quantizing the data on the detection pattern; a pattern printing step of printing a detection pattern based on the generated print data on the detection pattern; a measuring step of measuring the printed detection pattern; and a print control step of controlling printing based on the print data generated for the image data, based on a measurement result of the detection pattern.

In a third aspect of the present invention, there is provided an image processing apparatus for generating data for printing a detection pattern used in print control on a print medium, the image processing apparatus comprising: a print data generation unit configured to generate print data by performing predetermined pseudo halftone processing of image data to be printed for quantizing the image data; and a pattern data generation unit configured to generate print data on a detection pattern by performing the same predetermined pseudo halftone processing of data on the detection pattern for quantizing the data on the detection pattern.

According to the above configuration, it is possible to print a detection pattern used in print control, which cannot be easily viewed in an image printed on a print medium.

Further features of the present invention will become apparent from the following description of exemplary embodiments (with reference to the attached drawings).

DESCRIPTION OF THE EMBODIMENTS

Embodiments of the present invention will be described with reference to the attached drawings in detail.

First Embodiment

System Configuration

Figure 1:
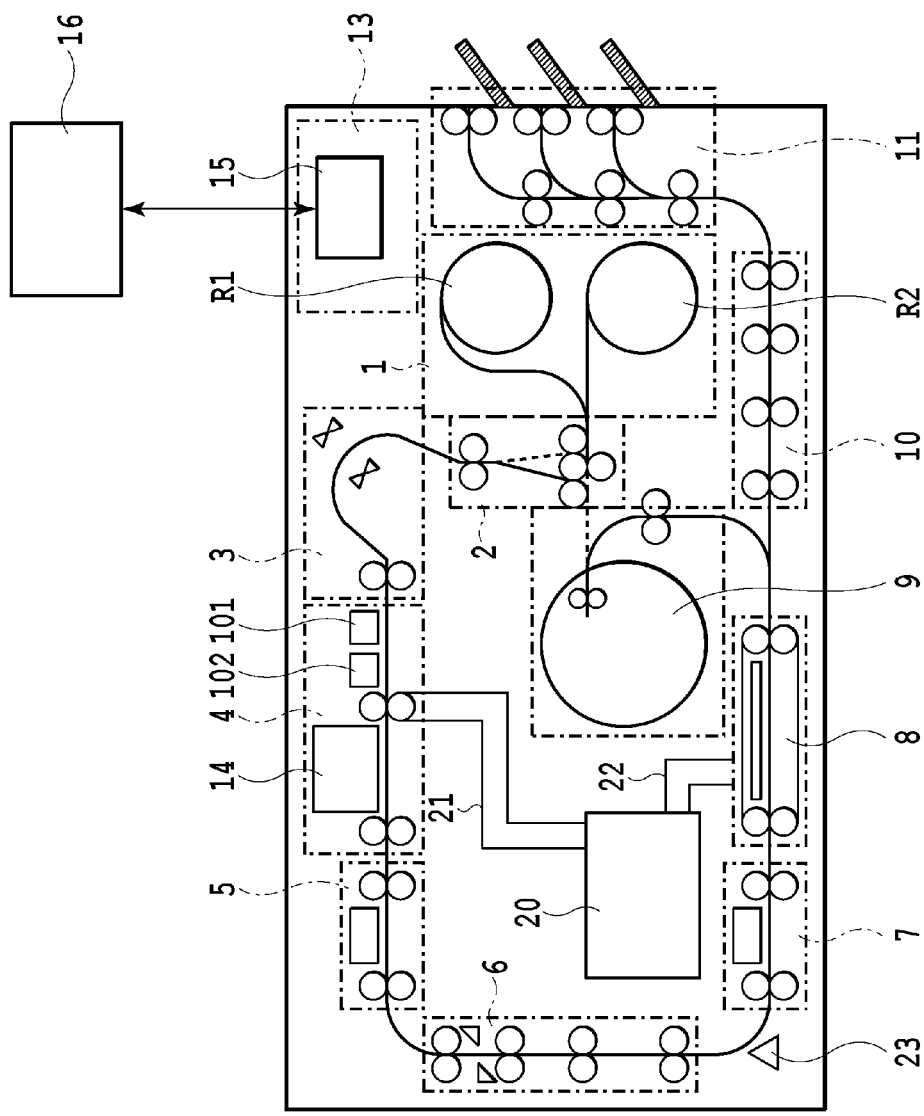
FIG. 1 is a cross-sectional view of an internal structure of an ink jet type printer according to one embodiment of the present invention.

FIG. 1 is a cross-sectional view of an internal structure of an ink jet type printer according to one embodiment of the present invention. A printing apparatus of the present embodiment is a line printer that uses a long continuous sheet and is adapted to both the simplex printing and the duplex printing. For example, the printing apparatus is suitable for the field of printing a large number of sheets, for example, in a print laboratory or the like. It should be noted that in the present specification, an area corresponding to one printing unit (one page) is regarded as a unit image even if it contains a plurality of small images, characters, or blanks. More specifically, the unit image means one printing unit (one page) when a plurality of pages are sequentially printed on a continuous sheet. The length of the unit image varies depending on the size of an image to be printed. For example, an L-size photo image has a length of 135 mm in a sheet conveying direction, and an A4-size photo image has a length of 297 mm in a sheet conveying direction. The present invention can be applied to a wide variety of printing apparatuses such as a printer, a multi-function printer, a copying machine, a facsimile machine, and an apparatus for producing various devices.

As shown in FIG. 1, the printing apparatus of the present embodiment uses a sheet wound in a roll as a print medium and can perform printing on both sides of the sheet, that is, a first side and a second side on the back of the first side. The printing apparatus of the present embodiment generally includes a sheet feeding unit 1, a de-curling unit 2, a skewing correcting unit 3, a printing unit 4, a detection unit 5, a cutting unit 6, an information printing unit 7, a drying unit 8, a reversing unit 9, a discharging/conveying unit 10, a sorting unit 11, a discharging unit 12, a humidifying unit 20, and a control unit 13. A sheet is conveyed by a conveying mechanism including roller pairs and belts along a sheet conveying path shown by solid lines in FIG. 1, and various kinds of processing are performed on the sheet in the respective units. In the present specification, it should be noted that in any position of the sheet conveying path, a position closer to the sheet feeding unit 1 is called "upstream" and a position in the opposite side is called "downstream."

The sheet feeding unit 1 is a unit for supporting and feeding a continuous sheet wound in a roll. The sheet feeding unit 1 can store two rolls R1 and R2 and alternatively draw and supply a sheet from the rolls. It should be noted that the number of rolls that can be stored is not limited to two, and one or three or more rolls may also be stored. Further, a sheet should not be limited to a roll as long as it is a continuous sheet. For example, a continuous sheet to which perforation is provided for each unit length may be folded and stacked at each position of perforation, and stored in the sheet feeding unit 1. The de-curling unit 2 is a unit for reducing a curl (warp) of a sheet fed from the sheet feeding unit 1. By using two pinch rollers relative to one drive roller, the de-curling unit 2 bends and passes the sheet by giving a warp reverse to a curl, so that a de-curling force is applied to the sheet to reduce a curl. The skewing correcting unit 3 is a unit for correcting skewing (inclination in an original traveling direction) of the sheet that has passed the de-curling unit 2. An end portion of the sheet in a reference side is pressed against a guide member, so that skewing of the sheet is corrected.

The printing unit 4 is a unit for forming an image on a conveyed sheet (print medium) through printing processing performed by a print head 14 provided above the sheet. The printing unit 4 has a plurality of conveying rollers for conveying the print head 14 and the sheet. The print head 14 is a so-called line-type print head having ink jet type nozzles arranged in an area covering the maximum width of a sheet assumed to be used in the present apparatus. The print head 14 has print heads for respective ink colors arranged in the sheet conveying direction. In the present embodiment, four print heads are arranged corresponding to four ink colors: C (cyan), M (magenta), Y (yellow), and K (black). It should be noted that the number of ink colors and the number of print heads are not limited to four. For an ink jet system, a system using a heat generating element, a system using a piezo-electric element, a system using an electrostatic element, a system using an MEMS element, or the like may be employed. Ink of each color is supplied to the print head 14 from an ink tank via each ink tube.

In the printing unit 4, a head 101 for direct sensing processing is provided upstream of the print head 14. This allows printing of a direct sensing pattern (hereinafter also referred to simply as "a detection pattern") for measuring an amount of conveyance of a sheet in a predetermined time, as its details will be described later (printing of a detection pattern). Further, downstream of the head 101, next to the head 101, a direct sensor 102 is provided for optically measuring the detection pattern printed by the head 101 (measurement of a detection pattern). The direct sensor 102 includes, for example, a CCD image sensor or a CMOS image sensor. The direct sensor 102 can, as will be described with reference to FIG. 4, capture an image in an area having a certain size at a time.

The detection unit 5 is a unit for optically reading, with a scanner, a detection pattern and an image printed on a sheet in the printing unit 4 and detecting a condition of nozzles in the print heads, a sheet conveyance status, an image position, or the like to determine whether the image has been properly printed. For the scanner, a CCD image sensor or a CMOS image sensor may be used. The cutting unit 6 is a unit having a mechanical cutter for cutting the printed sheet into a predetermined length. The cutting unit 6 also has a plurality of conveying rollers for sending the sheet into the following step. The information printing unit 7 is a unit for printing print information (unique information) such as a serial number or a date on a non-printing area of the cut sheet. Printing is performed by an ink jet system, a thermal transfer system, or the like to print characters and codes. A sensor 23 for detecting a leading edge of the cut sheet is provided upstream of the information printing unit 7 and downstream of the cutting unit 6. That is, the sensor 23 detects an end portion of the sheet between the cutting unit 6 and the position in which printing is performed by the information printing unit 7. Based on the detection timing of the sensor 23, a timing at which information is printed by the information printing unit 7 is controlled.

The drying unit 8 is a unit for heating the sheet printed in the printing unit 4 and drying ink applied to the sheet for a short period of time. Inside the drying unit 8, hot air is applied to the passing sheet at least from the lower side so as to dry a surface to which ink is applied. It should be noted that a drying system is not limited to a system of applying hot air. A system in which electromagnetic waves (ultraviolet radiation, infrared radiation, or the like) are applied to a sheet surface may also be employed.

The above-described sheet conveying path from the sheet feeding unit 1 to the drying unit 8 is referred to as a first path. The first path has the shape of a U-turn from the printing unit 4 to the drying unit 8, and the cutting unit 6 is located in the middle of the U-turn shape.

The reversing unit 9 is a unit for temporarily winding up a continuous sheet after printing of a front side is finished in duplex printing and reversing the sheet, from the front side to the back side. The reversing unit 9 is provided in the middle of a path (loop path) (referred to as a second path) from the drying unit 8 to the printing unit 4 through the de-curling unit 2, for feeding again to the printing unit 4 the sheet that has passed the drying unit 8. The reversing unit 9 has a wind-up rotary body (drum) for winding up the sheet by rotation. The continuous sheet that has not cut after the printing of the front side is temporarily wound up into the wind-up rotary body. After wound up, the sheet is supplied to the de-curling unit 2 by the wind-up rotary body that reversely rotates, and then sent to the printing unit 4. As the sheet is already reversed, the printing unit 4 may perform printing on the back side.

The discharging/conveying unit 10 is a unit for conveying the sheet cut in the cutting unit 6 and dried in the drying unit 8 and passing the sheet to the sorting unit 11. The discharging/conveying unit 10 is provided in a path (referred to as a third path) which is different from the second path in which the reversing unit 9 is located. To selectively guide the sheet that has been conveyed in the first path, to the second path or to the third path, a path switching mechanism having a movable flapper is provided in a branch position of the paths. The sorting unit 11 and the discharging unit 12 are provided next to the sheet feeding unit 1 and at the end of the third path. The sorting unit 11 is a unit for sorting the printed sheets into groups as needed. The sorted sheets are discharged into the discharging unit 12 having a plurality of trays. As described above, the third path passes below the sheet feeding unit 1 toward a side opposite to the printing unit 4 and the drying unit 8 with respect to the sheet feeding unit 1 so that the sheets are discharged.

The humidifying unit 20 is a unit for generating humidified gas (air) and supplying it between the print head 14 of the printing unit 4 and the sheet. This prevents ink in the nozzles of the print head 14 from being dried. As a humidification system of the humidifying unit 20, a vaporization system, a water spray system, a steam system, or the like may be employed. Examples of the vaporization system include not only a rotary type of the present embodiment, but also a permeable membrane type, a drop penetration type, and a capillary type. Examples of the water spray system include an ultrasound type, a centrifugal type, a high-pressure spray type, and a two-fluid spray type. Examples of the vaporization system include a steam tubing type, an electro-thermal type, and an electrode type. The humidifying unit 20 and the printing unit 4 are connected by a first duct 21, and further, the humidifying unit 20 and the drying unit 8 are connected by a second duct 22. The drying unit 8 generates high-humidity and high-temperature gas when drying a sheet. This gas is introduced to the humidifying unit 20 through the second duct 22 and used as an auxiliary energy for generating humidified gas in the humidifying unit 20. The humidified gas generated in the humidifying unit 20 is introduced to the printing unit through the first duct 21.

The control unit 13 is a unit for controlling the units of the entire printing apparatus. The control unit 13 has a CPU, a storage device, a controller (control unit) including control parts, an external interface, and an operation part 15 for a user to perform inputting/outputting. The processing and operations in the printing apparatus, including control of printing of a detection pattern according to the embodiments of the present invention as will be described with reference to FIG. 5 and others, are controlled based on instructions from the controller or a host device 16 such as a host computer connected to the controller via the external interface.

Figure 2:
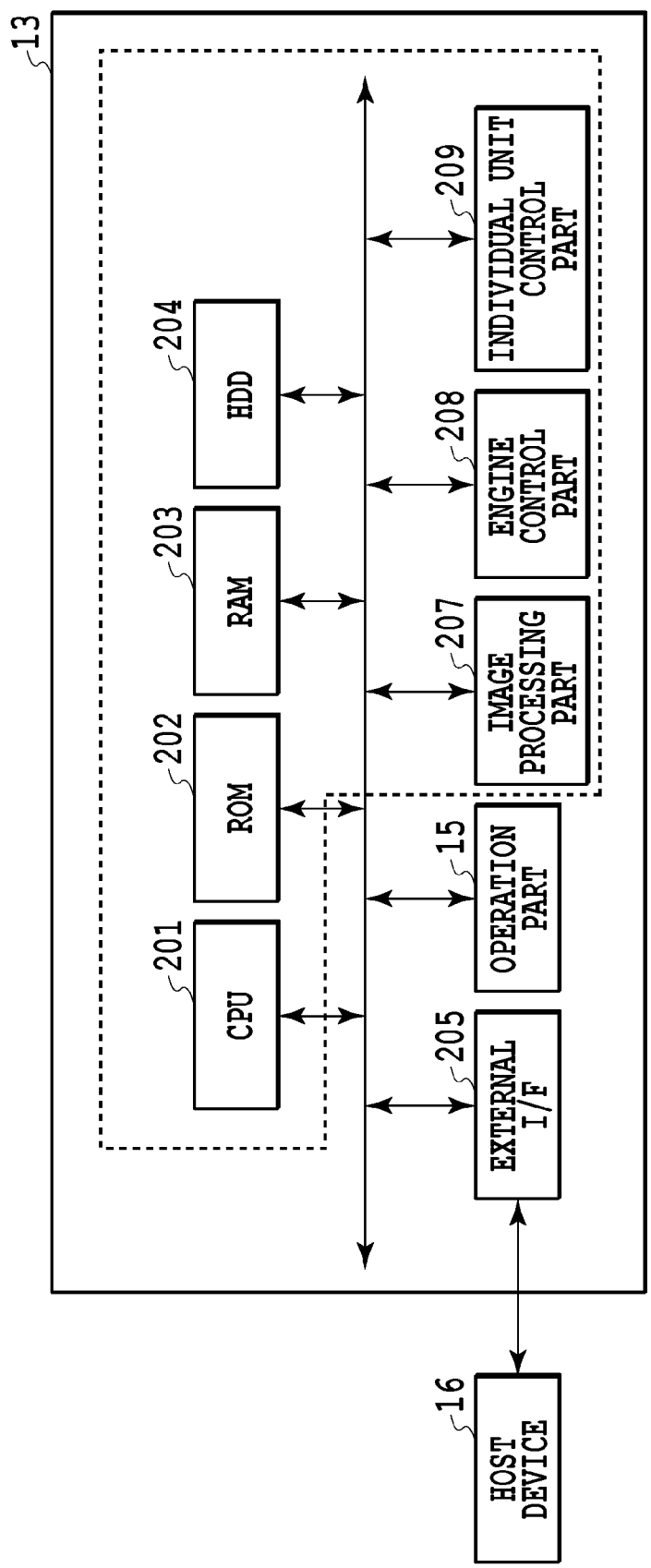
FIG. 2 is a block diagram showing a detailed structure of a control unit shown in FIG. 1.

FIG. 2 is a block diagram showing a detailed configuration of the control unit 13 shown in FIG. 1. The controller (the area surrounded by broken lines) included in the control unit 13 includes a CPU 201, a ROM 202, a RAM 203, a HDD 204, an image processing part 207, an engine control part 208, and an individual unit control part 209. The CPU 201 (central processing unit) has control over the operations of the units in the printing apparatus. The ROM 202 stores therein programs executed by the CPU 201 and fixed data needed for the various operations in the printing apparatus. The RAM 203 is used as a work area for the CPU 201 or a temporary storage area for various kinds of received data, and stores therein various kinds of setting data. The HDD 204 (hard disk) can store and read programs executed by the CPU 201, print data, and setting information needed for the operations in the printing apparatus. The operation part 15 is an input/output interface between the printing apparatus and a user, and includes an input part, such as a hard key and a touch panel, and an output part, such as a display for presenting information and a speech generator. For example, a display with a touch panel is used to display to a user an operation status of the apparatus, a printing status, maintenance information (a remaining amount of ink, a remaining amount of sheets, a maintenance status, or the like), and the like. The user can input various kinds of information using the touch panel.

A dedicated processing part is provided in a unit requiring a relatively high speed in data processing. The image processing part 207 performs image processing on print data handled in the printing apparatus. The image processing part 207 converts a color space (for example, YCbCr) of inputted image data into a standard RGB color space (for example, sRGB). The image processing part 207 further performs color separation processing to convert the RGB image data into data on C, M, Y, and K inks used in the printer of the present embodiment. In addition, the image processing part 207 performs various kinds of image processing on the image data on ink colors as needed such as resolution conversion, image analysis, and image correction. Then, the image processing part 207 performs quantization (binarization) on the multivalued image data (for example, 256 levels) thus obtained for each of the C, M, Y, and K inks to generate print data (binary data) for each of the C, M, Y, and K inks. In the present embodiment, as will be described later, binarization processing is performed by using a dither pattern (dither processing). In this respect, the printing apparatus of the present embodiment forms an image processing apparatus.

The print data obtained through the above image processing is stored in the RAM 203 or the HDD 204. Further, the image processing part 207 also performs processing such as control of the head 101 for direct sensing (described later), analysis of captured data obtained from the direct sensor 102, and sending an analysis result to the engine control part 208 as a feedback.

The engine control part 208 controls driving of the print head 14 of the printing unit 4 according to the print data based on a control command received from the CPU 201 or the like. The engine control part 208 further controls a conveying mechanism of the units in the printing apparatus. The individual unit control part 209 is a sub controller for individually controlling the units, such as the sheet feeding unit 1, the de-curling unit 2, the skewing correcting unit 3, the detection unit 5, the cutting unit 6, the information printing unit 7, the drying unit 8, the reversing unit 9, the discharging/conveying unit 10, the sorting unit 11, the discharging unit 12, and the humidifying unit 20.

Based on instructions from the CPU 201, the individual unit control part 209 controls operations of the units. An external interface 205 is an interface (I/F) for connecting the controller to the host device 16, and is a local I/F or a network I/F. The above-described constituent elements are connected with each other via a system bus 210.

The host device 16 is a device for providing image data for causing the printing apparatus to perform printing. The host device 16 may be a general-purpose or dedicated computer or a dedicated image device such as an image capture having an image reading part, a digital camera, and a photo storage. If the host device 16 is a computer, an OS, application software for generating image data, and a printer driver for the printing apparatus are installed in a storage device included in the computer. It should be noted that it is not necessary to cause software to achieve all of the above processing. Hardware may achieve part or all of the above-described processing.

<Printing Unit>

Figure 3:
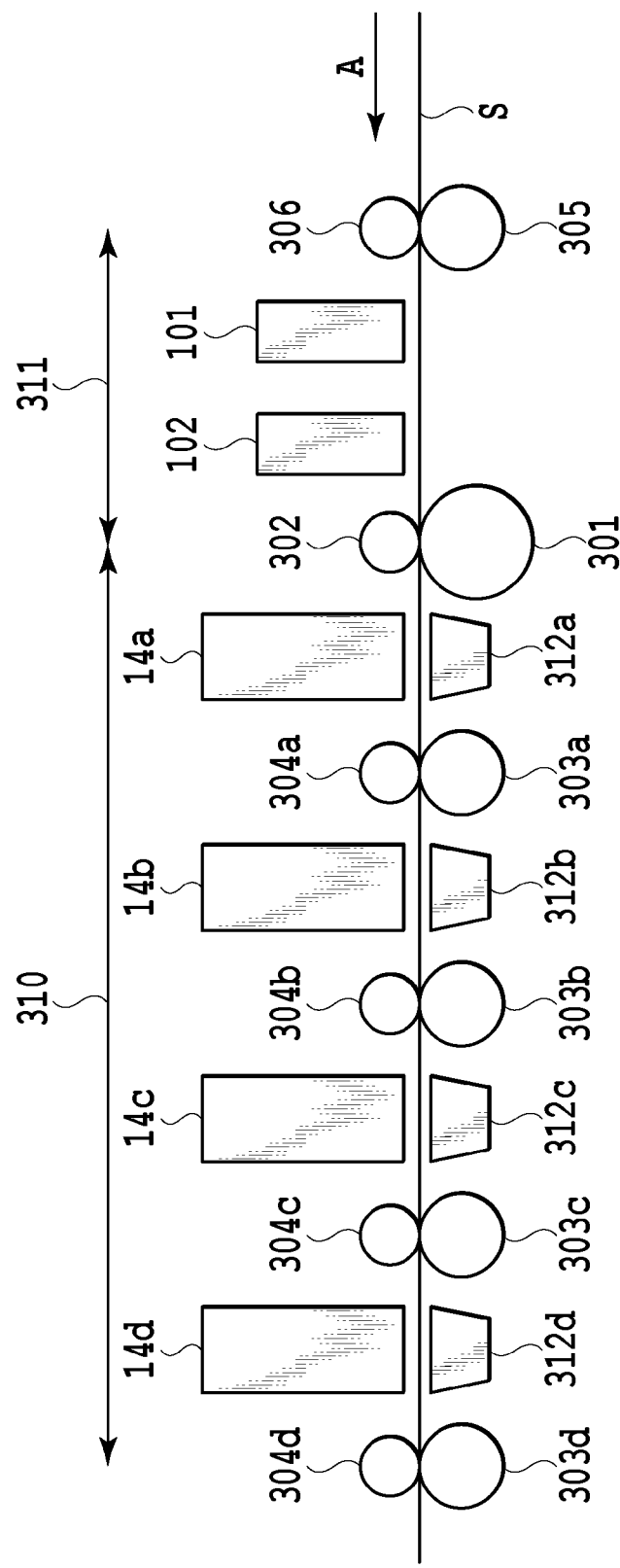
FIG. 3 is a view showing a detailed structure of a printing unit shown in FIG. 1.

FIG. 3 is a view showing a detailed structure of the printing unit 4 shown in FIG. 1. In the printing unit 4, a sheet S is conveyed in an arrow A direction in FIG. 3 with three types of roller pairs: a first roller pair, a second roller pair, and a third roller pair. The first roller pair is a roller pair including a conveying roller 301 to which a drive force is transferred and a pinch roller 302 that rotates following the conveying roller 301. The second roller pair indicates each of four roller pairs including a plurality of conveying rollers 303*a* to 303*d* to which a drive force is transferred and a plurality of pinch rollers 304*a* to 304*d* that rotate following the conveying rollers 303*a* to 303*d*, respectively. The third roller pair is a roller pair including a conveying roller 305 to which a drive force is transferred and a pinch roller 306 that rotates following the conveying roller 305.

In a printing area 310 downstream of the first roller pair, four line-type print heads 14*a* to 14*d* corresponding to respective colors of ink are arranged in the sheet conveying direction. Each of the line-type print heads 14*a* to 14*d* is staggered with respect to each of the pinch rollers 304*a* to 304*d*. In the positions opposite to the print heads 14*a* to 14*d*, platens 312*a* to 312*d* are provided, respectively, to support the sheet S. Since the sheet S in its upstream and downstream sides is nipped by the roller pairs and is supported by the platens in the respective positions opposite to the print heads 14*a* to 14*d*, the behavior in the sheet conveyance is stable. Particularly when a sheet is first introduced, since a leading end of the sheet passes a plurality of nipping positions in short cycles, it is possible to prevent the leading end of the sheet from rising. Thus, the sheet is stably introduced.

The head 101 for direct sensing prints a detection pattern for direct sensing on the sheet S as will be described with reference to FIGS. 5 and 6, etc. The detection pattern is captured by the direct sensor 102. The direct sensor 102 includes a light source (for example, a white LED) for illuminating a sheet surface and a light receiving part such as a photo diode or an image sensor for detecting light reflected on the illuminated sheet surface for each of RGB components. More specifically, the direct sensor 102 may include a plurality of line image sensors having a plurality of photoelectric transducers of a CCD or CMOS structure arranged one-dimensionally, or may be an area image sensor having a plurality of photoelectric transducers of a CCD or CMOS structure arranged two-dimensionally. That is, the direct sensor 102 is a sensor that can image a detection pattern at a time in a two-dimensional area having a certain size.

Figure 4:
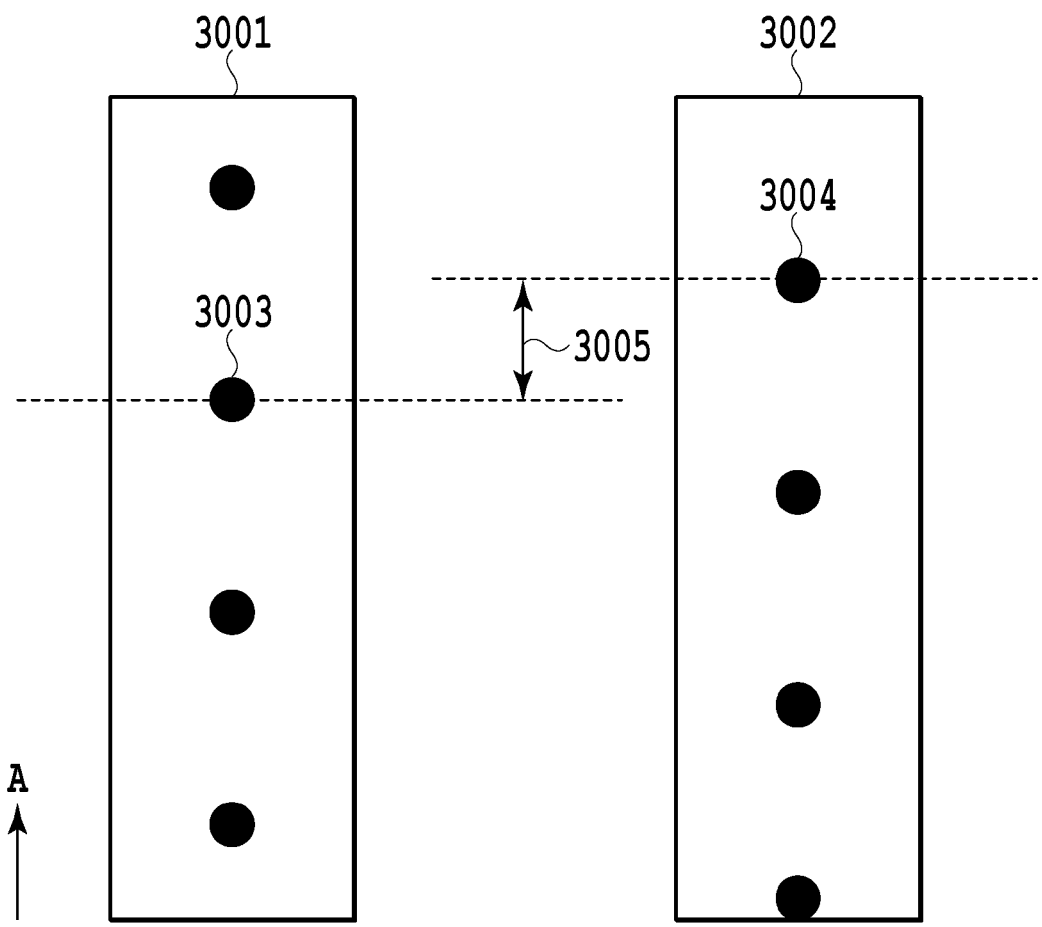
FIG. 4 is a view illustrating the principle of detection of a detection pattern by a direct sensor according to a first embodiment of the present invention.

FIG. 4 is a view illustrating the principle of detection of a detection pattern by the direct sensor 102 according to the present embodiment. More specifically, FIG. 4 shows images captured at different timings by the direct sensor 102 that can image a two-dimensional area at a time. Each captured image shows a partial area of the surface of the conveyed sheet. The sheet is conveyed in the arrow A direction in the figure. An image 3001 is an image first captured, and an image 3002 is an image captured after the sheet has moved for a predetermined time from the time the image 3001 was captured. The captured images include arrays of dots which are detection patterns printed on the sheet. Then, in detecting a detection pattern in these captured images, a search is made for where in the captured image 3002 acquired after a predetermined time associated with the above-mentioned different timing exists a position 3003 of a certain dot in the captured image 3001. As a result, it is detected that the dot exists in a position 3004 shown by a broken line in the captured image 3002. In this search, based on, for example, a maximum change in an amount of conveyance that may be produced in the apparatus and a conveyance speed of a sheet, it is determined how much the position of the dot changes in the predetermined time, and the dot within a range of the position change is identified as a corresponding dot in the captured image 3002 acquired after the predetermined time.

Next, it is detected, in the captured images, by how many pixels, the dots identified as the same dot between the two captured images are separated in a conveying direction, and the resultant is obtained as a movement amount 3005 of the sheet in the above-mentioned predetermined time. Here, coordinates for measuring the number of pixels between the dots with respect to the movement amount are fixed to the direct sensor 102. More specifically, the above-mentioned movement amount is obtained based on the number of captured pixels according to a resolution of the direct sensor 102. It should be noted that coordinates for obtaining a movement amount is not limited to this. Any coordinates may be used as long as the coordinates are fixed apart from the conveyed sheet.

Furthermore, a difference between the movement amount 3005 thus obtained and a movement amount set in advance as a reference is obtained as a change in an amount of conveyance in the above-mentioned predetermined time.

More specifically, after the captured image 3001 is acquired at a timing t1, the captured image 3002 is acquired at a timing t2 after a predetermined time T1 has passed.

Then, by searching the same dot between the two captured images, a movement amount between the two dot positions is obtained. For example, if the movement amount 3005 corresponding to the above-obtained pixels after conversion is 810 µm and a movement amount as a predetermined reference after conversion is 800 µm, a difference of +10 µm is a change in the amount of conveyance in the predetermined time T1. A change of +10 µm in the predetermined time T1 means that the conveyance speed has increased. On the other hand, if a change is a negative value "−", it means that a conveyance speed has decreased. The changes in speed thus obtained are, as will be described later, sent to the following conveyance control as feedbacks. Based on the feedbacks, the amount of conveyance (conveyance speed) is adjusted.

<Direct Sensing>

Details of direct sensing processing according to a first embodiment of the present invention will now be described. The direct sensing processing according to the present embodiment uses a dither pattern used in quantization (binarization) processing for generating print data for printing an image of the present embodiment and generates print data on a detection pattern (generation of detection pattern data).

Figure 5:
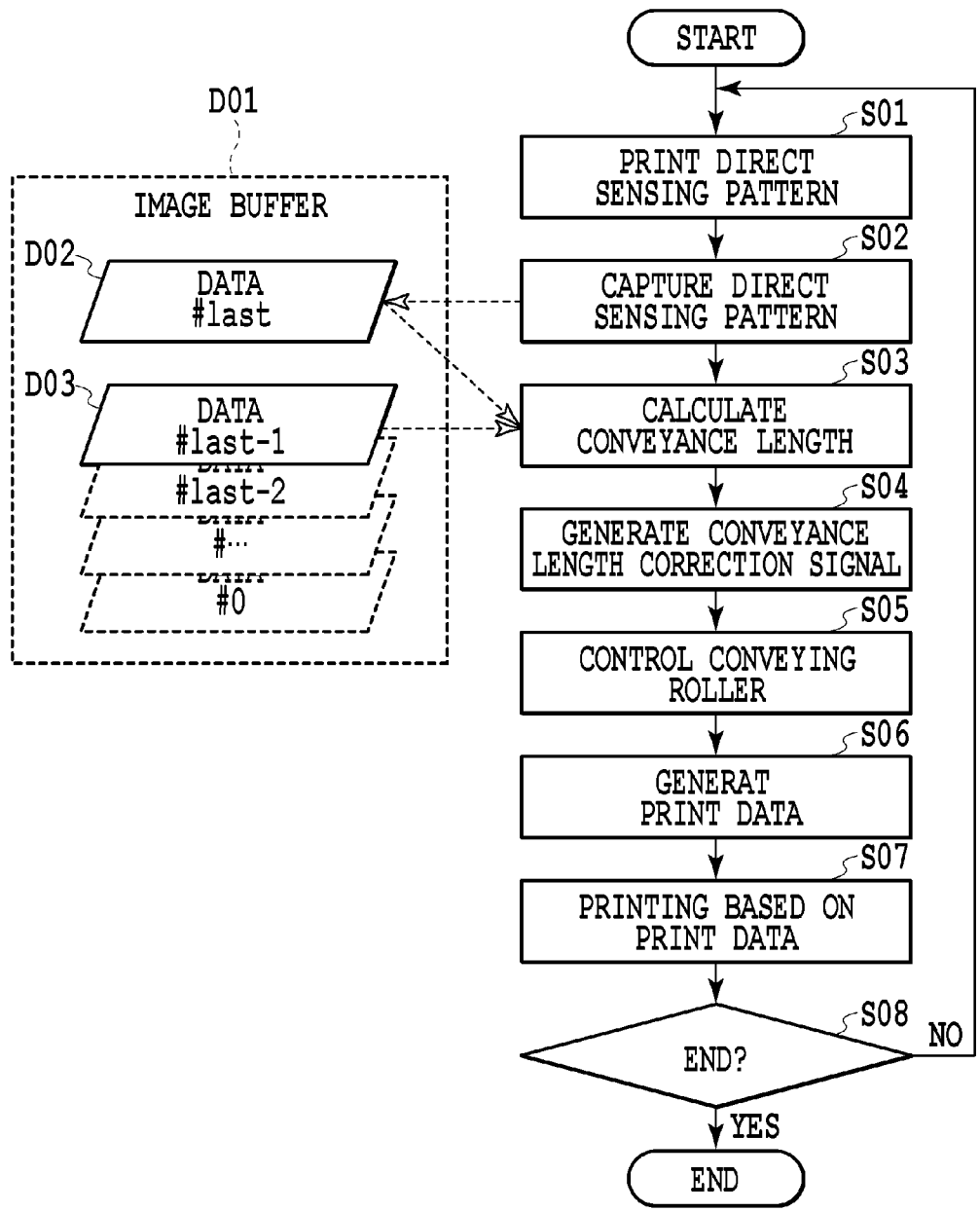
FIG. 5 is a flowchart showing conveyance amount control based on direct sensing processing and the processing result thereof according to the first embodiment.

FIG. 5 is a flowchart showing the direct sensing processing and conveyance amount control based on the result of the direct sensing processing, according to one embodiment of the present invention.

First, a detection pattern for direct sensing is printed by using the head 101 (S01). In this processing, binary print data for printing a detection pattern is generated by using a dither pattern used in quantization processing for printing an image. Then, based on the binary data, the head 101 is driven to print a detection pattern.

Figure 6:
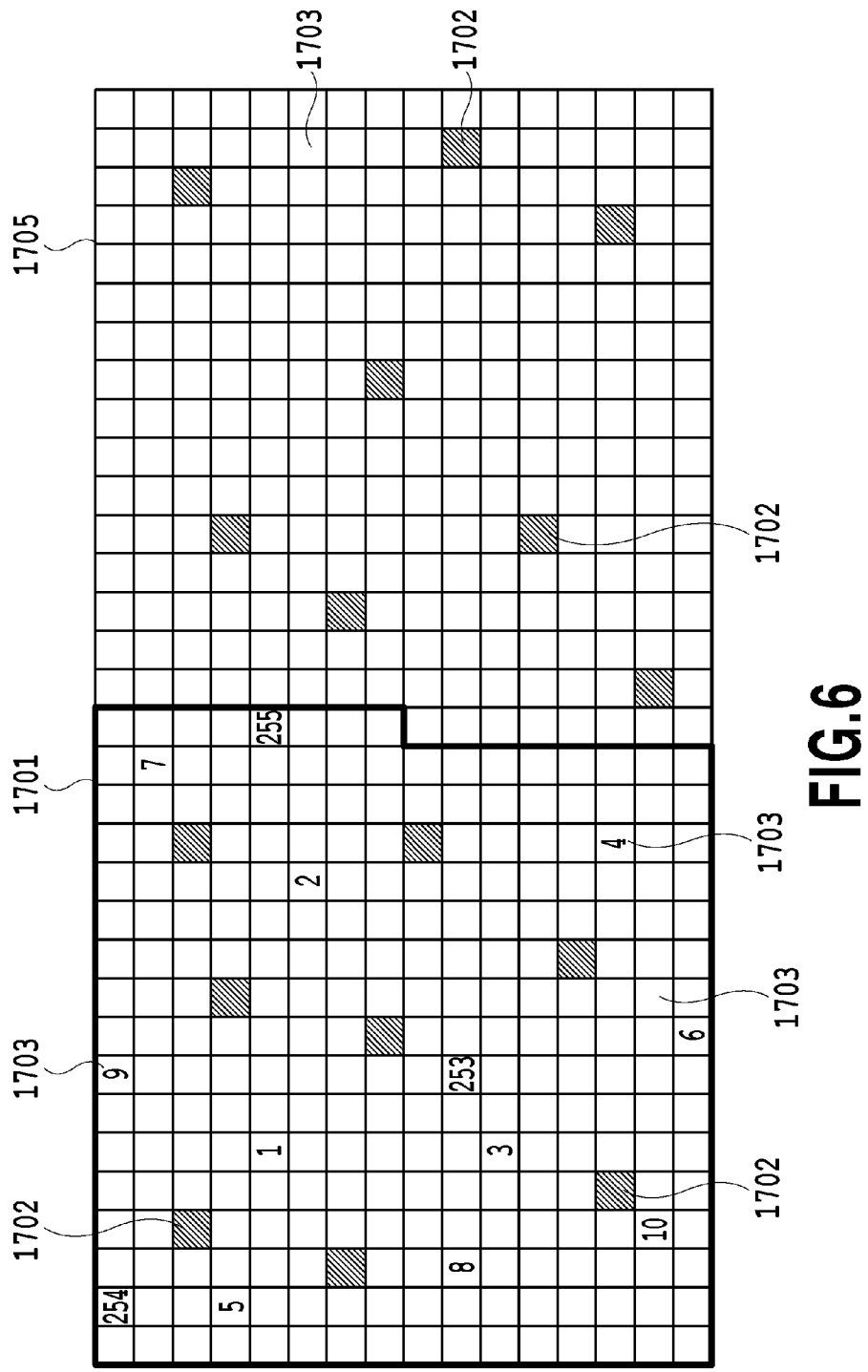
FIG. 6 is a view illustrating a detection pattern used in the first embodiment of the present invention.

FIG. 6 is a view illustrating a dither pattern used in the present embodiment. In FIG. 6, an area surrounded by a thick line denoted by a reference numeral 1701 shows a dither pattern of a unit (hereinafter also referred to as a dither matrix). The dither matrix of a unit is a pattern of a predetermined size: 16×16 pixels+1×8 pixels. Of these pixels, to 8 pixels 1702 (pixels shown by oblique lines), thresholds for generating dots for a detection pattern are assigned. Further, to remaining pixels 1703 (pixels shown by blanks or values (thresholds)) in the dither matrix 1701, thresholds in 256 levels (from "0" to "255") for generating print data for printing an image are assigned. The arrangement of the thresholds for generating 8 dots for detection and the thresholds for printing an image may be a dot dispersion-type arrangement such as a Bayer type. This can make a detection pattern for direct sensing less visible in a more preferable manner. It should be noted that the dither matrix to be used is not limited to this. Any dither matrix may be used as long as it can finally make a detection pattern less visible in terms of the relation between a dither matrix and a printed image. In the present embodiment, the dither matrix 1701 shown in the figure is commonly used for print data on C, M, Y, and K inks. A detection pattern is printed for one color, for example, black (K). Therefore, the print data on the detection pattern printed in the current step S01 is generated only for the K ink. It should be noted that the dither matrix 1701 may vary depending on the C, M, Y, and K inks in another mode.

Detection pattern data by using the above-described dither matrix is specifically generated as follows. To all of 8 pixels 1702 in the dither matrix 1701, a threshold "256" is assigned. On the other hand, for detection pattern data, multivalued detection pattern data (256 levels) consisting of 16×16 pixels+1×8 pixels, which is the same size as the dither matrix, is prepared. Then, all of the pixel values in the multivalued detection pattern data are set to "256". Quantization processing is performed on the multivalued detection pattern data by applying the dither matrix 1701, so as to obtain print data on the detection pattern consisting of 8 dots. More specifically, in the present embodiment, with respect to the pixels in the multivalued detection pattern data respectively corresponding to the pixels in the dither matrix, quantization is performed to generate binary data indicating that a dot is printed ("1") when data on the pixel has a value equal to or greater than a threshold. Accordingly, the detection pattern consisting of 8 dots can be expressed by the same pattern of the pixels shown by the oblique lines in FIG. 6. As described, the pixel value of the multivalued detection pattern data is set to a value greater by 1 than the maximum value ("255") of the pixel value of image data to be printed. At the same time, the thresholds assigned to the above-mentioned 8 pixels in the dither matrix are set to "256", so that quantization data on a detection pattern can be generated by using the dither matrix used in quantization for printing an image. As a result, like the arrangement of dots forming an image to be printed, the arrangement of the dots forming the detection pattern is in accordance with a pattern of thresholds specified in the dither matrix, such as the above-mentioned dot dispersion-type arrangement. In other words, the arrangement of the dots forming the detection pattern may have a predetermined relation (specified by the dither matrix) with the arrangement of dots forming an image to be printed, and accordingly, the detection pattern cannot be easily viewed as part of the image printed particularly in terms of gradation.

Meanwhile, in the quantization (binarization) processing on the image data for printing by using the above-described dither matrix of the present embodiment, from the multivalued image data, image data having a size of 16×16 pixels+1×8 pixels is extracted corresponding to a unit of the dither matrix shown in FIG. 6. Then, quantization is performed on the extracted image data by applying the unit of the dither matrix having the same size and shape. In this manner, image data having a size corresponding to the size of the dither matrix of 16×16 pixels+1×8 pixels is sequentially extracted, and quantization is performed. Portions of the image data extracted corresponding to the portions of 1×8 pixels shown in the dither matrix 1701 and the dither matrix 1705 of FIG. 6 also have a shape corresponding to the portions of 1×8 pixels of the respective matrixes, so that they are nested with each other.

It should be noted that in the printing of the detection pattern and the printing of the image of the present embodiment as described above, a state in which 8 dots forming the detection pattern are printed is set as a minimum optical density level, and density gradation in 256 levels can be expressed in a pseudo manner. More specifically, if a brightness when no dot is printed on a sheet is set to 1 (light) and a brightness when dots are printed on all pixels is set to 0 (dark), printing of the present embodiment is restricted such that a value 1−8/(256+8) represents the highest brightness level. However, 256 gradation levels can be expressed from (1−8/(256+8)) to 0. Then, even if the sheet is in the state of 1−8/(256+8), it becomes difficult for human eyes to recognize the density as long as it is particularly uniform as a whole. Further, if a pattern of 8 dots is changed to a pattern of fewer dots, it becomes more difficult for human eyes to recognize the density. In addition, by arranging the dots forming the detection pattern in a dispersed manner as possible, visibility for the dots may further be reduced.

It should be noted that in the example shown in FIG. 6, the number of dots forming the detection pattern is eight. However, the number of dots may be decreased to four or increased to 16 for example, if the shape of the dither matrix and the arrangement of the adjacent dither matrixes are changed.

It should be noted that in the present embodiment, the dither matrix 1705 is used, as shown in FIG. 6, in performing quantization on adjacent image data including 16 pixels×16 pixels in an image to be printed (on the right of FIG. 6). The dither matrix 1705 is basically the same as the dither matrix 1701, but the arrangement of threshold pixels corresponding to 1 pixel×8 pixels is reverse as compared to the arrangement in the dither matrix 1701. Alternately using the two dither matrixes 1701 and 1705 can quantize the entire image data.

Figure 7:
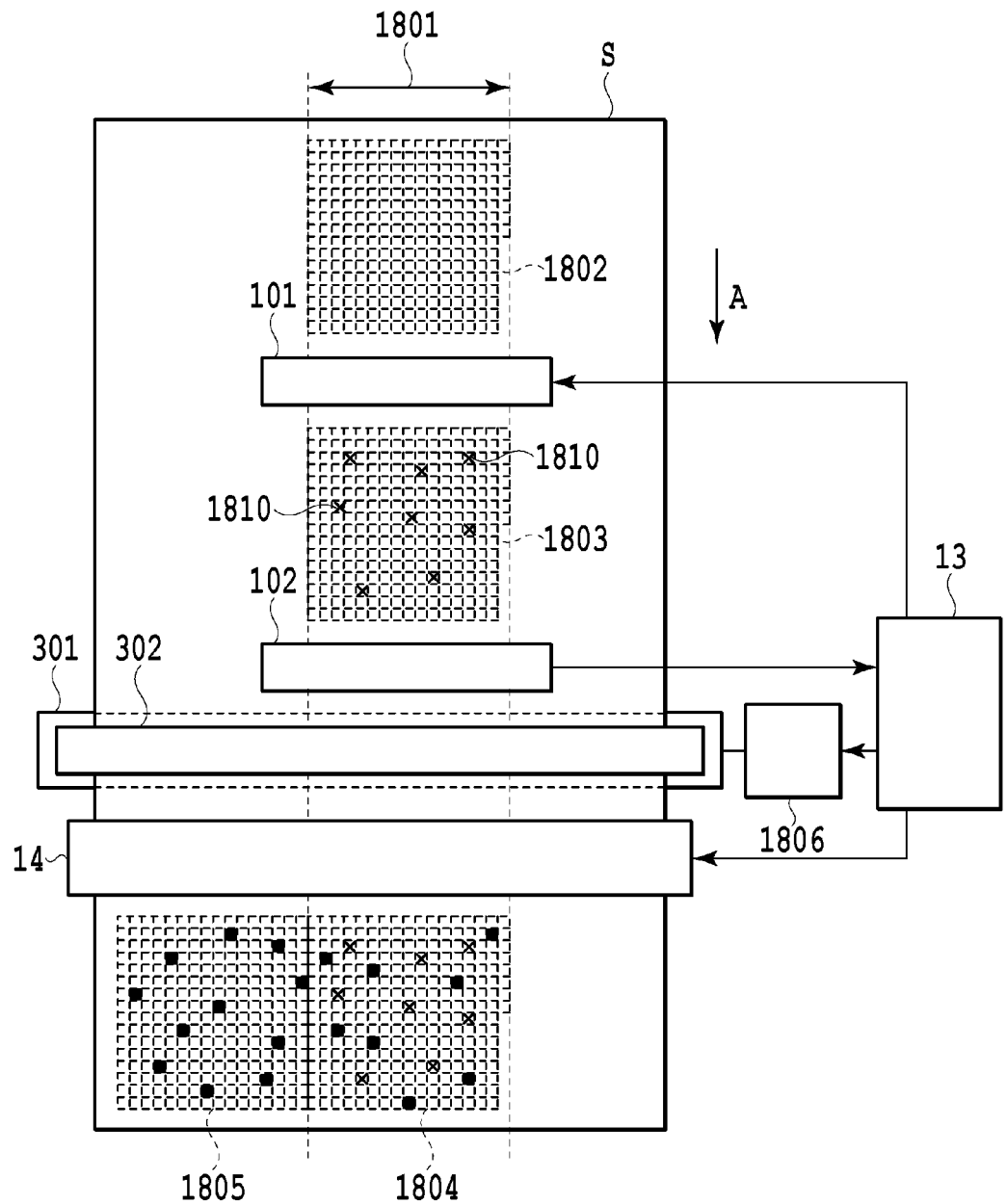
FIG. 7 is a view illustrating printing of a detection pattern and image data according to the first embodiment.

FIG. 7 is a view illustrating printing of a detection pattern and image data obtained as described above, and shows a sheet, a print head, and the like when the printing unit 4 is viewed from the top. FIG. 7 shows one print head 14 for the sake of simplicity, and an explanation is made on an example of the case of printing a detection pattern and an image by using only the K ink.

Referring back to FIG. 5, in step S01, based on the quantized print data for the detection pattern as described above, the head 101 for direct sensing is used to print 8 dots 1810 (dots represented by "×" in FIG. 7) for the detection pattern. It should be noted that in the detection pattern, as shown in FIG. 7, a unit of the detection pattern consisting of 8 dots (a unit area in which a pattern unit is printed is hereinafter also referred to as a "block") is repeatedly printed in a conveying direction of the sheet S in a detection pattern area 1801, which is a partial area of the sheet S. Upstream of the direct sensing print head 101, there is an area 1802, in which a detection pattern is not printed yet, corresponding to the above-described dither matrix. The sheet S is conveyed in the conveying direction shown by the arrow A, and when the area 1802 passes below the direct sensing print head 101, the direct sensing print head 101 is driven by the control of the control unit 13 and a detection pattern as shown by an area 1803 is printed based on the print data for the detection pattern generated as described above with reference to FIG. 6.

Next, in step S02, when the area 1803 passes below the direct sensor 102, as described above with reference to FIG. 4, a detection pattern is captured, and the captured data is stored in an image buffer D01 in the RAM 203 of the control unit 13.

Figure 8C:
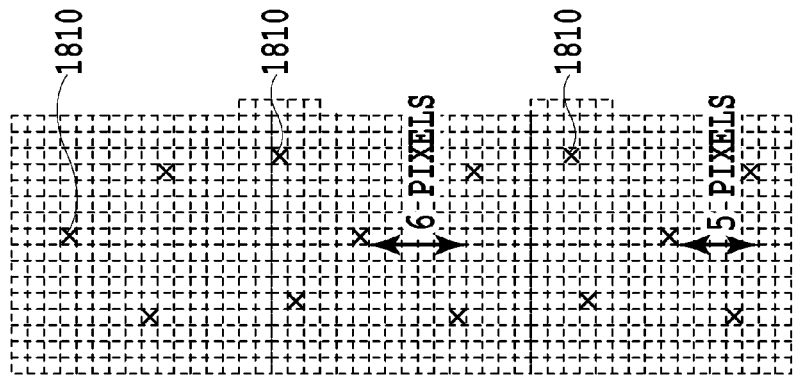
FIGS. 8A to 8C are views illustrating detection of a detection pattern by a direct sensor according to the first embodiment.
Figure 8B:
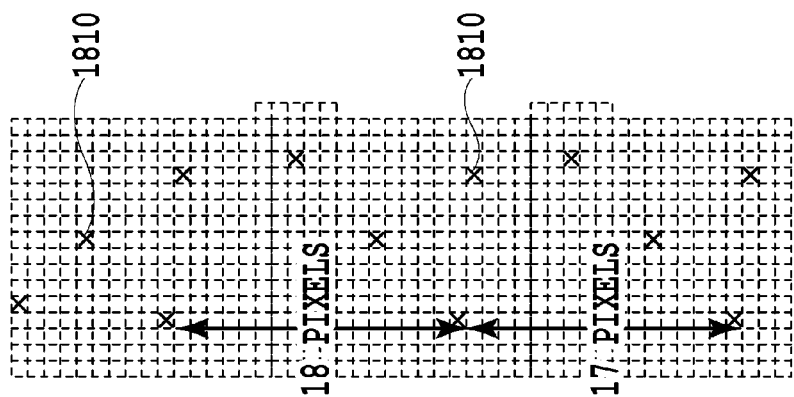
Figure 8A:
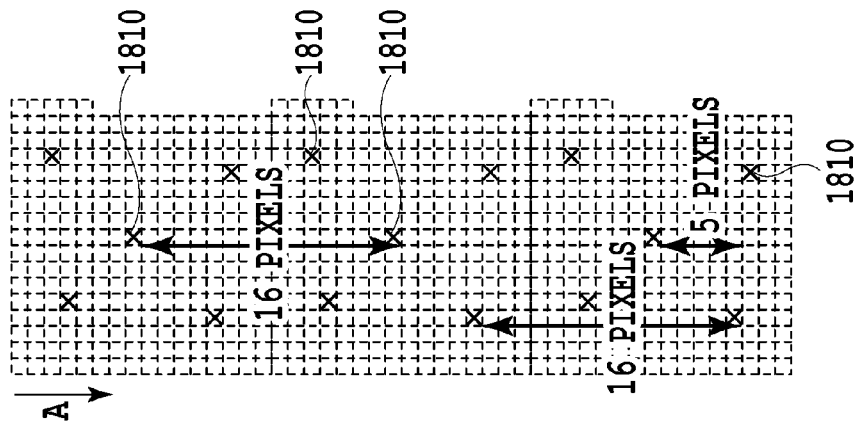

FIGS. 8A to 8C are views illustrating detection of a detection pattern by the direct sensor 102 according to the present embodiment. As described above with reference to FIG. 4, FIGS. 8A to 8C show three images captured at timings in intervals of a predetermined time T1 (represented by three blocks in a vertical direction in the respective figures). It should be noted that to simplify illustration and explanation, a description will be given of a detection pattern consisting of 5 dots 1810 (dots represented by "×" in FIGS. 8A to 8C).

FIG. 8A shows captured data when the sheet S is conveyed at a regular conveyance speed, which is a reference movement amount, as described above with reference to FIG. 4. In this case, a movement amount of a dot associated with detection between adjacent blocks is 16 pixels, which is the reference movement amount. The positional relation of dots in a block is identical in all of the blocks.

FIG. 8B shows captured data when a movement amount of a dot for the detection pattern changes between the blocks due to a change in conveyance speed of the sheet S from a regular amount of conveyance associated with the above-mentioned reference movement amount. In the example shown in FIG. 8B, a movement amount of a predetermined dot between the lower block and the middle block is 17 pixels. Next, a movement amount of a predetermined dot between the middle block and the upper block is 18 pixels. As a result, as compared to a reference movement amount of 16 pixels, a movement amount has increased by 1 pixel (+1) in the conveyance in a predetermined time T1 between the blocks. That is, it can be detected that conveyance is performed in a higher conveyance speed by 1 pixel, and the error is accumulated one by one.

FIG. 8C shows captured data when a movement amount of a dot changes within a block according to another example of detection. That is, FIG. 8C shows the case where a conveyance speed has changed while capturing the detection patterns of the middle block and the lower block, and a dot movement amount is displaced from the reference movement amount within the block. In the example shown in FIG. 8C, in the lower block, the distance between the lower left dot and the middle dot corresponds to regular 5 pixels in the conveying direction. On the other hand, in the middle block, the distance between the lower left dot and the middle dot corresponds to 6 pixels. The movement amount of the middle dot, which is a predetermined dot associated with detection, has increased by 1 pixel (+1).

Referring back to FIG. 5, in step S04, a correction amount of a conveyance speed to be corrected is calculated based on the amount of conveyance (conveyance length) for a unit time calculated in step S03. For example, in the case of the example shown in FIG. 8B, a delay by one pixel for the predetermined time T1 can return the conveyance speed to a normal conveyance speed.

Next, in step S05, a rotation speed of a motor 606 which drives the conveying roller 301 and the pinch roller 302 that rotates following the conveying roller 301 is controlled by a conveyance amount correction signal generated in step S04. Although FIG. 7 does not show the second roller pairs and the third roller pair, the amount of conveyance is controlled with respect to these roller pairs in the same manner. Next, in step S06, processing is performed, such as color separation processing in which input data to be printed on the sheet S is converted into ink colors and gamma correction processing in accordance with ejection characteristics of the print head, to generate print data on an image to be printed. Then, in step S07, the print head 14 is driven based on the print data generated in step S06 to eject ink for printing. At this time, as described above with reference to FIG. 6, data on the pixels 1702 for the detection pattern are not printed, and printing is performed based on data on the remaining pixels 1703.

In the above description, an example of printing a detection pattern only on part of the sheet S by using the direct sensing print head 101. However, the detection pattern may be printed on the entire area of the sheet S. This causes gradation to have an influence on part or all of the sheet S, but it is possible to print a detection pattern that cannot be easily viewed in a printing process in which printing is performed according to area gradation like the present embodiment. In the above example, the detection pattern is printed with the K ink by way of example, but other inks may also be used. In particular, as the K ink is conspicuous, it is preferable to use the Y ink which is less conspicuous. Further, in the above example, a dither method is used in pseudo halftone processing, but pseudo halftone processing by using other method such as error diffusion may also be used. The error diffusion may be achieved by, for example, forming the required number of dots for the detection pattern in the area 1801.

Second Embodiment

In the above-described first embodiment, a description has been given of the case where a dither matrix is structured in a manner that dots for printing an image do not overlap with the dots for a detection pattern. In a mode in which dots for a detection pattern are printed such that a printing position of a detection pattern dot is added to dots to be printed, a dot coverage area of a print medium relatively greatly varies due to a change in gradation, leading to a great change in density. In a second embodiment of the present invention, such a great change in density is suppressed. The configuration of the present embodiment is the same as the one of the first embodiment except for a different configuration as will be described below. The description of the same configuration will be omitted.

Figure 9:
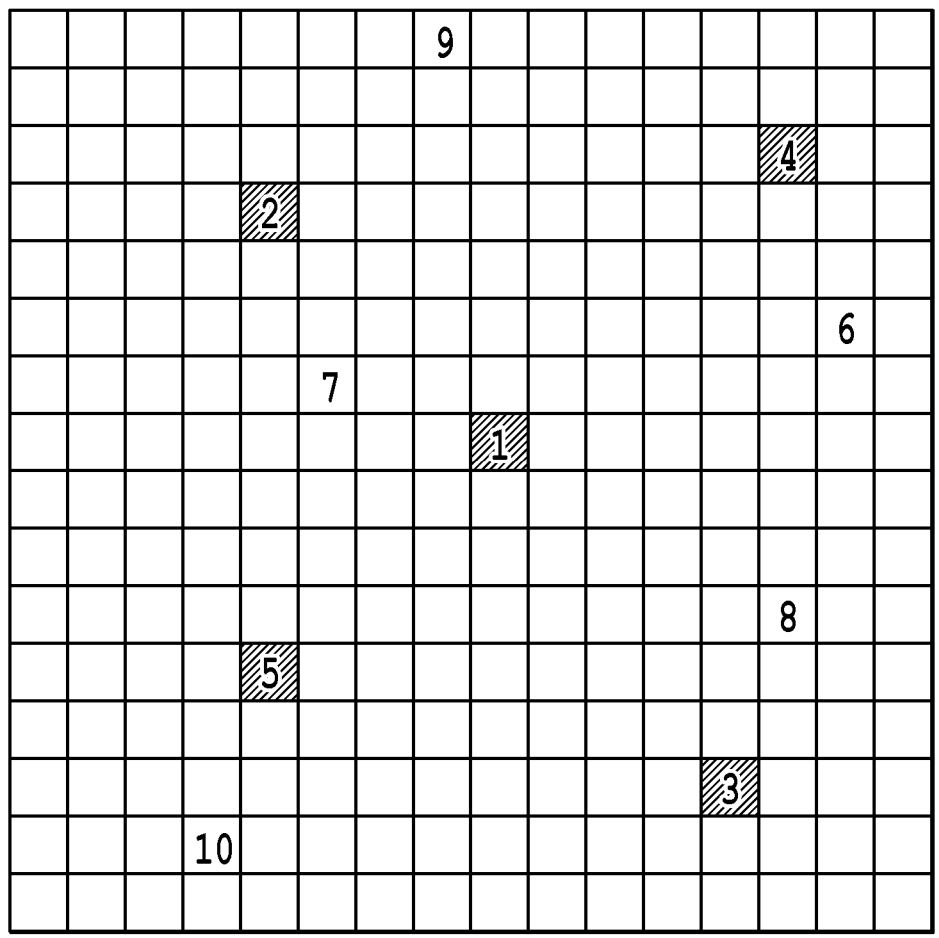
FIG. 9 is a view showing a dither matrix according to a second embodiment of the present invention.
Figure 10:
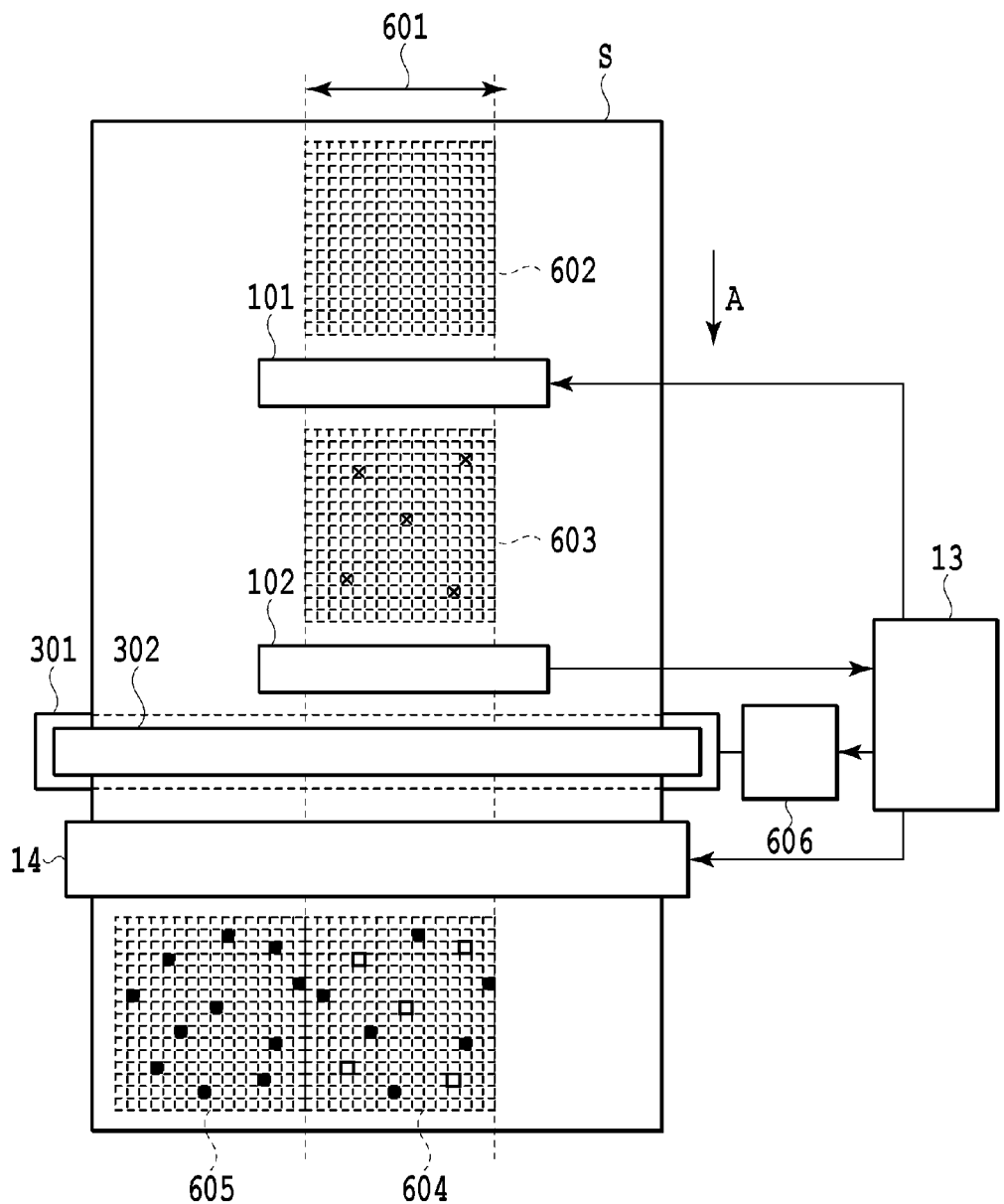
FIG. 10 is a view illustrating printing of a detection pattern and image data according to the second embodiment.

FIG. 9 is a view showing a dither matrix according to the second embodiment of the present invention. As shown in FIG. 9, the dither matrix of the present embodiment is 16×16 pixels in size, and a threshold of 1 to 256 is set to each pixel (FIG. 9 shows only a threshold of 1 to 10). FIG. 10 is a view illustrating printing of a detection pattern and image data according to the present embodiment, and is the same view as FIG. 7 according to the first embodiment. By way of example, a description will be given of the case where only K ink is used for the sake of simplicity like the first embodiment. In FIG. 10, therefore, only one print head 14 is shown.

In the dither matrix of the present embodiment, a threshold of 1 to 5 is set to a threshold pixel shown by oblique lines in FIG. 9. Accordingly, if a value of multivalued data on each dot for the detection pattern of the K ink is "5" or greater, a K ink dot for the detection pattern is printed on a pixel corresponding to the threshold pixel shown by the oblique lines. The detection pattern is printed in a detection pattern area 601 on a surface of a sheet S as shown in FIG. 10. Upstream of a direct sensing print head 101, there is an area 602, in which a detection pattern is not printed yet. The sheet S is conveyed in a conveying direction shown by an arrow A, and when the area 602 passes below the direct sensing print head 101, ink is ejected from the direct sensing print head 101 under the control by a control unit 13, and a detection pattern as shown by an area 603 is printed based on the print data generated corresponding to the above-described dither matrix. The detection pattern thus printed is detected in the same manner as the above-described first embodiment, and a change in conveyance speed is detected.

Then, based on the print data on the image to be printed, ink is ejected from the print head 14 to print an image. Details of image printing processing are as follows. For example, it is assumed that all of the values of the K ink in the target print data including 16×16 pixels are "10". In this example, in areas 604 and 605, pixel data corresponding to a threshold pixel having a threshold less than 11 in the dither matrix shown in FIG. 9 is printed. As a result, as shown in FIG. 10, in the area 605 in which a detection pattern is not printed, dots for the image are printed on pixels shown by filled squares. On the other hand, in the area 604, the dots for the detection pattern are already printed on pixels shown by blank squares, and the dots for the print image are printed over those pixels. If a comparison is made between the case where dots are printed in an overlapping manner as described above and a change in coverage area is small and the case where dots are printed on different pixels like the first embodiment, that is, the case where a dot coverage area on a sheet surface increases in proportion to the number of dots, the density of the image perceived by a human varies. That is, if a change in coverage area is suppressed by printing dots in an overlapping manner as in the present embodiment, a change in density is hardly perceived as compared to the case where the coverage area changes according to the number of dots. As a result, it is possible to set a color difference between the areas 604 and 605 such that the color difference is less likely to be perceived. In addition, by printing dots used for the detection pattern as small as possible, the influence thereof may be further suppressed.

According to the above-described embodiment, while printing a detection pattern and analyzing the pattern to correct the amount of conveyance, it is possible to prevent poor image quality caused by printing of the detection pattern.

Third Embodiment

In the above-described second embodiment, the dots for printing an image are printed over the dots for the detection pattern on the surface of the sheet S, so that a great change in gradation is suppressed. However, in some printing results, an object image may not be faithfully reproduced. In a third embodiment of the present invention, improvements are made in this respect, and image reproducibility is enhanced.

In the present embodiment, in the print data generation processing in step S06 of FIG. 5, print data on an image to be printed on a sheet S is corrected. More specifically, generation of print data is controlled such that a dot to be printed for printing an image will not be printed on a pixel on which a dot for a detection pattern is printed. As described in the second embodiment, this can prevent the dot by the print data and the dot for the detection pattern from being printed in an overlapping manner.

Figure 11:
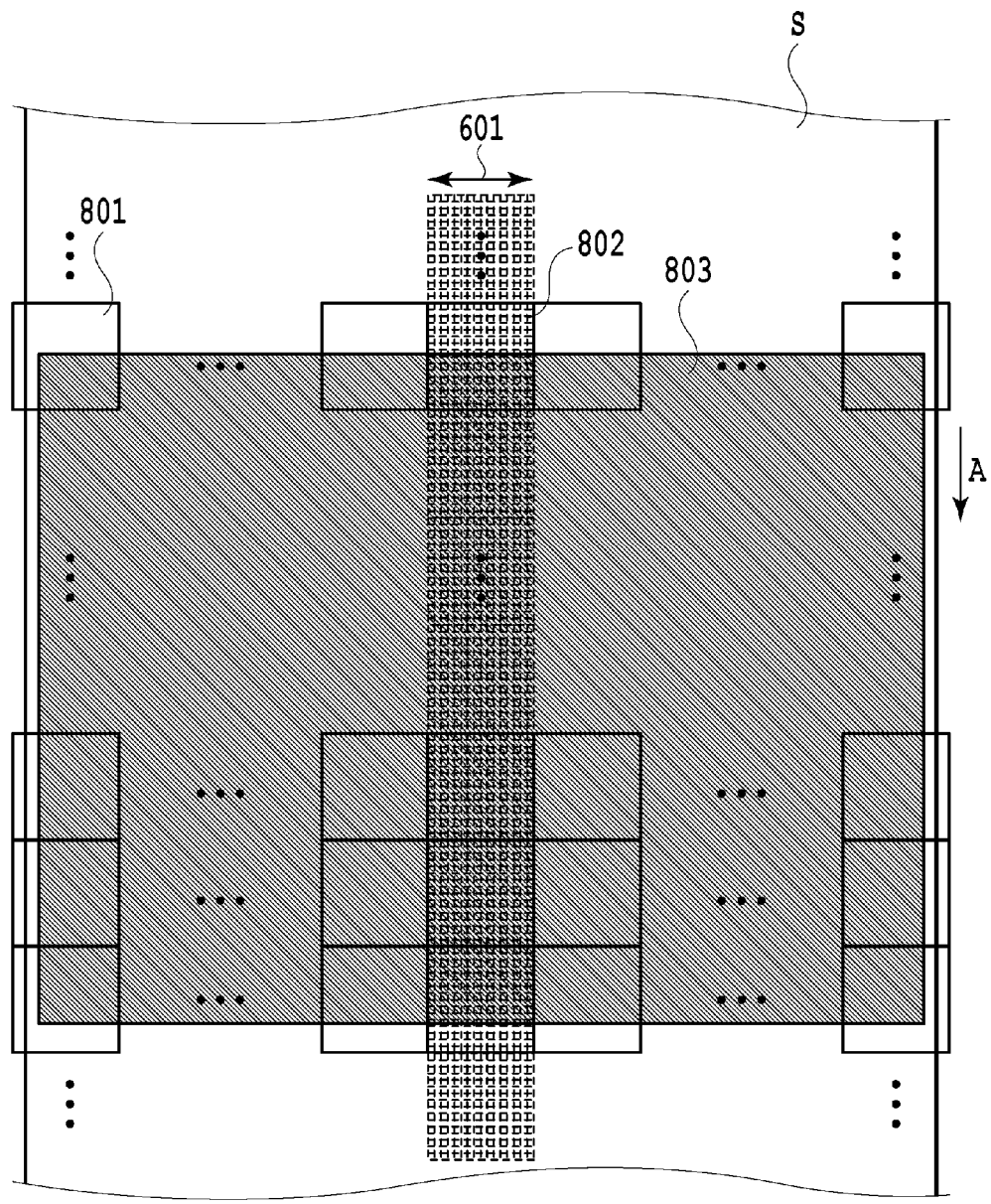
FIG. 11 is a view showing the relationship between a dither matrix and a printing area of a direct sensing pattern according to a third embodiment of the present invention.

FIG. 11 is a view illustrating control of the print data generation and shows the relationship between a dither matrix and a printing area of a direct sensing pattern. In control of the print data generation, as shown in FIG. 11, while moving a detection target matrix 801, it is detected which pixel in print data 803 corresponds to a pixel (802) on which the dot for the detection pattern is printed. Data on K ink of the detected pixel is converted into 0, meaning that a dot of the K ink will not be printed to the detected pixel.

Figure 12:
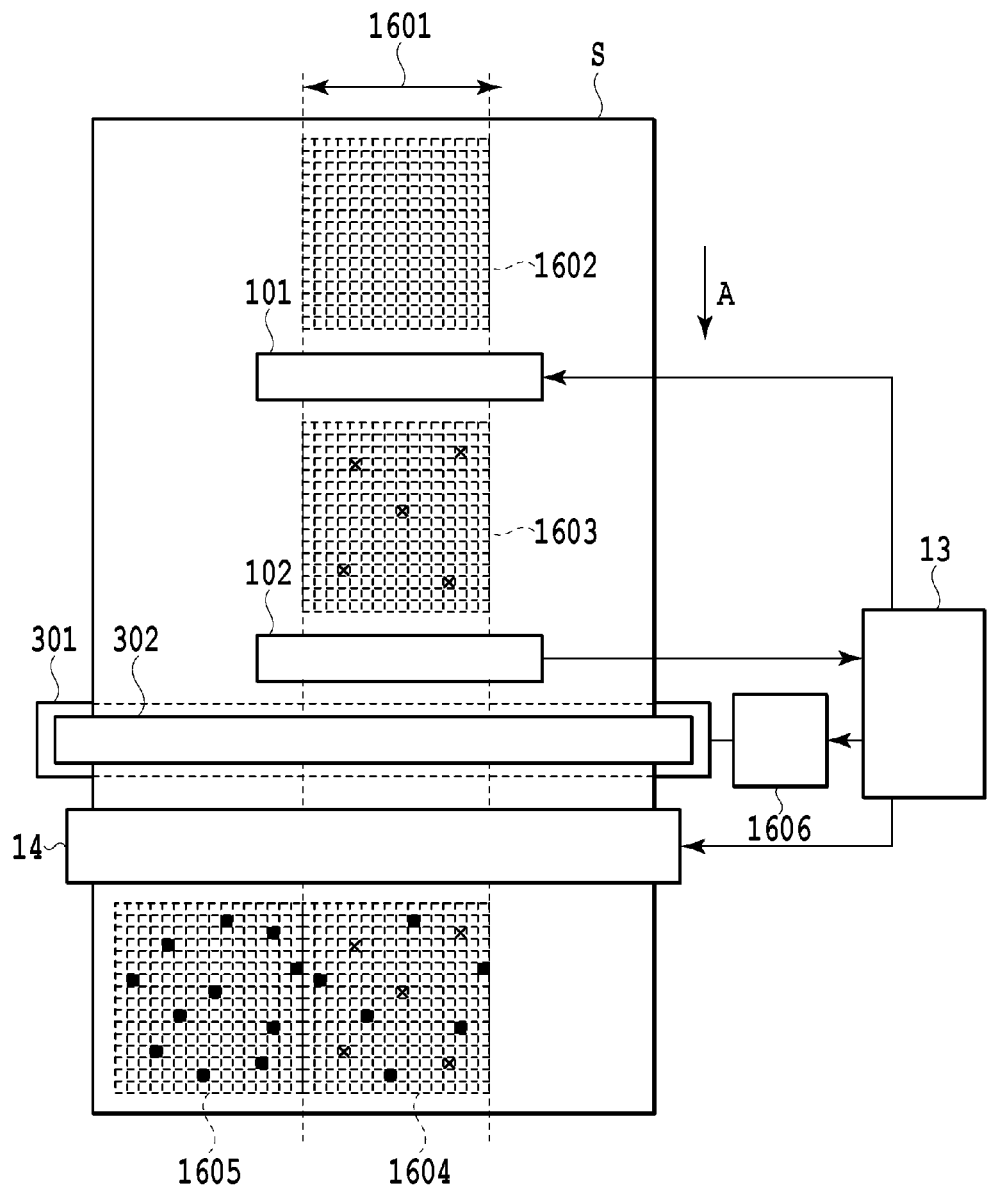
FIG. 12 is a view illustrating printing of a detection pattern and image data according to the third embodiment.

FIG. 12 is a view illustrating printing of a detection pattern and image data according to the present embodiment, and is a similar view to FIG. 7 according to the first embodiment. Like the second embodiment, it is assumed that all of the values of the K ink in the print data including 16×16 pixels in areas 1604 and 1605 in FIG. 12 are "10". In this case, by the print data generation of the present embodiment, pixels having a threshold less than 11 in the dither matrix are printed. When the dither matrix shown in FIG. 9 is used, in a printing result of the area 1605 in which a detection pattern is not printed, as shown in FIG. 12, dots for a print image are printed on pixels shown by filled squares. On the other hand, in the area 1604 in which a detection pattern is also printed, dots of the K ink are printed only on pixels shown by filled squares, and pixels represented by a sign "×" are replaced by print data indicating that a dot is not printed. More specifically, since a value of the print data is replaced by 0, a dot is not printed. However, the K dot for the detection pattern is printed on a pixel represented by the sign "x", the same printing result as the one of the area 1605 in which a detection pattern is not printed can be obtained. This can faithfully reproduce an object image.

However, in the actual print data, data values variously change in 16×16 pixels. Therefore, dots of the ink may not always be printed according to the print data on the pixels used for the detection pattern. However, if an average density of 16×16 pixels is greater than a predetermined level, that is, greater than 6 in the preset embodiment, the pixel used for the detection pattern is more likely to be printed in view of the characteristics of the pseudo halftone processing by the dither matrix. Accordingly, influence of degradation of image quality may be reduced. Further, even if the pixels used for the detection pattern are printed as unnecessary dots, decreasing the number of such dots can suppress degradation of image quality.

Fourth Embodiment

In the above embodiments, descriptions have been given of the example of printing detection patterns arranged in a line in the conveying direction on the surface of the sheet S. However, since humans have a high sensitivity to such fixed patterns in view of their visual characteristics, it is preferable to design the arrangement of detection patterns such that they cannot be easily viewed. In a fourth embodiment of the present invention, control is performed such that it becomes more difficult for human eyes to recognize a detection pattern.

Figure 13:
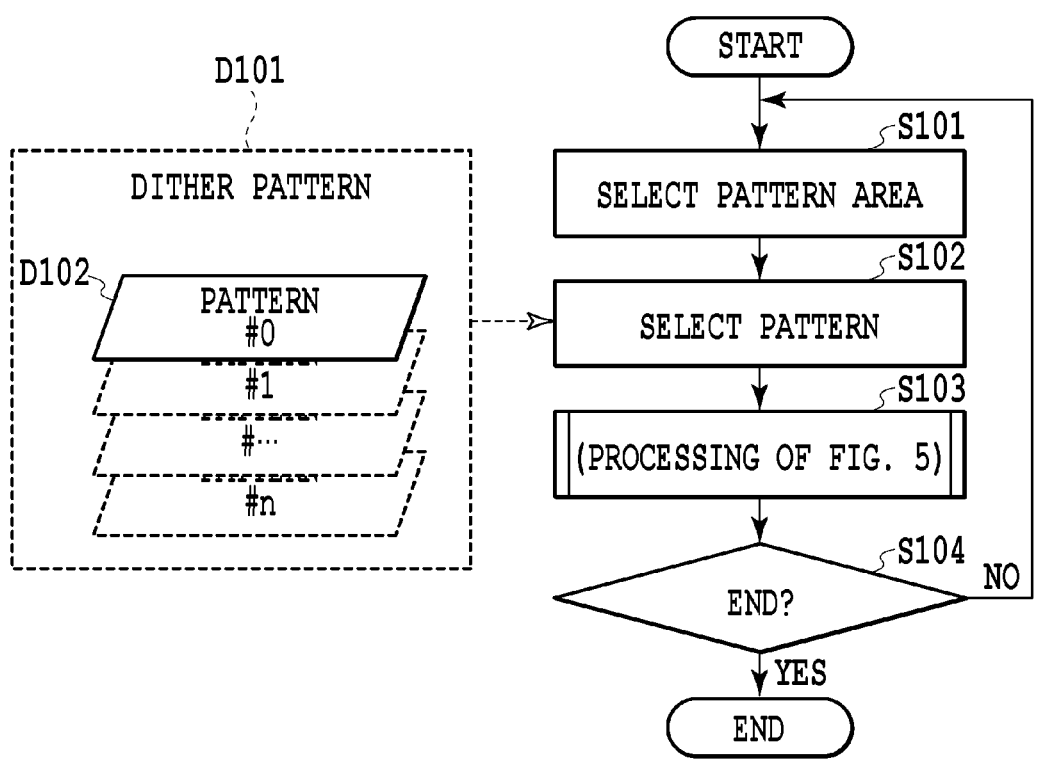
FIG. 13 is a flowchart showing selection of a detection pattern area and selection processing of a detection pattern according to a fourth embodiment of the present invention.
Figure 14:
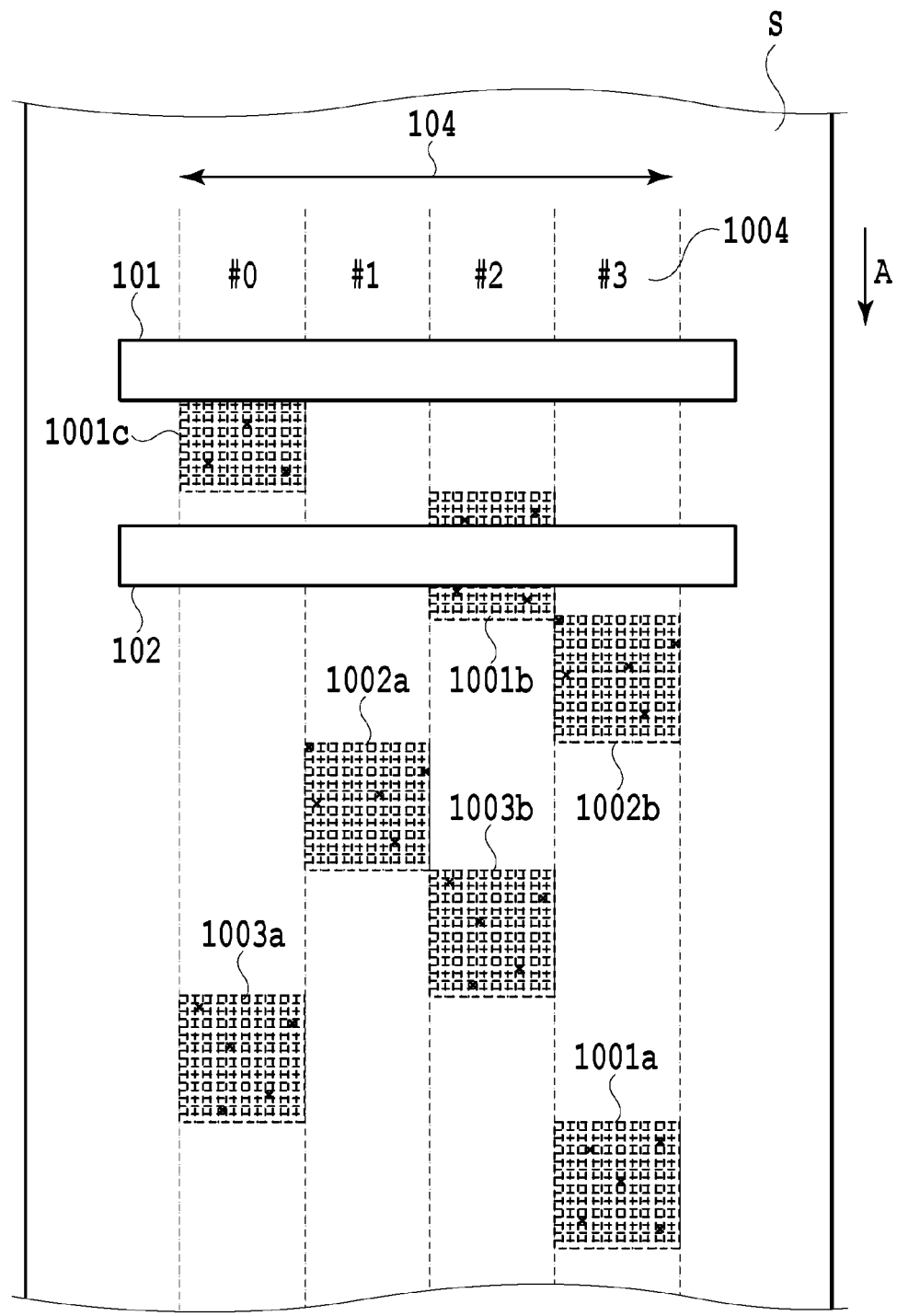
FIG. 14 is a view showing printing results of detection patterns as a result of the processing shown in FIG. 13.

In the present embodiment, before the processing in step S01 of FIG. 5, selection of a detection pattern area and selection processing of a detection pattern are performed. FIG. 13 is a flowchart showing selection of a detection pattern area and selection processing of a detection pattern according to the fourth embodiment of the present invention. FIG. 14 is a view showing printing results of detection patterns as a result of the processing shown in FIG. 13.

In the present embodiment, a direct sensing print head 101 includes 64 ink ejection nozzles, and in the case of a dither pattern consisting of 16×16 pixels, detection patterns are printed by dividing an area into four (64/16=4). That is, as shown in FIG. 14, a detection pattern area 104 on a surface of a sheet S is divided into four, and the resulting areas are denoted by #0, #1, #2, and #3 from left to right in FIG. 14.

Figure 15:
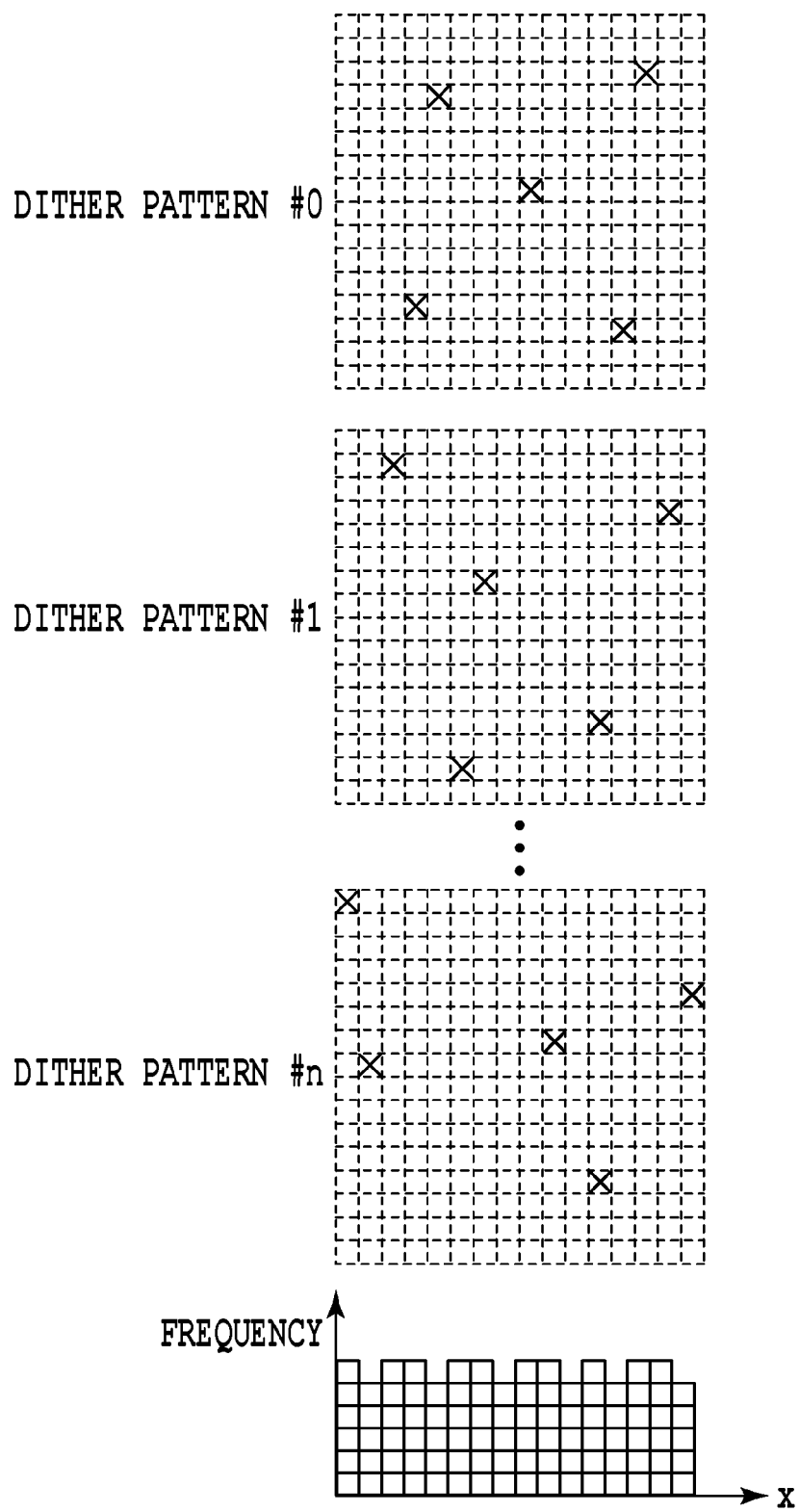
FIG. 15 is a view showing a plurality of dither patterns and the number of uses of each dither pattern according to the fourth embodiment of the present invention.

In step S101 of FIG. 13, it is determined in which area of the areas #0, #1, #2, and #3 in the detection pattern area 104, a detection pattern is printed. This determination may satisfy a condition that the areas #0, #1, #2, and #3 are selected substantially at an equal frequency, but it is preferable that repetitions in constant cycles be avoided, such as #0→#1→#2→#3→#0→#1 . . . . Further, in step S102, a dither pattern D101 used for a detection pattern is selected from a plurality of dither patterns D102. As shown in FIG. 15, there are n dither patterns D102, and FIG. 15 shows the number of uses as a "frequency" for each dither pattern. The use frequencies are substantially the same when the use frequency is added up for each ink ejection nozzle of the direct sensing print head 101 (a nozzle array direction is represented by x).

As described above, by selecting from the dither patterns D102 according to the condition that the areas are selected at an equal frequency like the area selection in step S101, it is possible to avoid unevenness in use frequencies of nozzles in the direct sensing print head 101. It is also possible to produce an effect of extending a useful life of the direct sensing print head 101. After a detection pattern is selected in step S103, the processing described above with reference to FIG. 5 is performed in step S104. This processing is repeated for each area. As a result, the detection patterns are printed as shown in FIG. 14. It should be noted that FIG. 14 omits printing of an image for the sake of simplicity. FIG. 14 shows an example of using three detection patterns 1001, 1002, and 1003. More specifically, first, a detection pattern 1001a is printed in the area #3 of the detection pattern area 104 and then read by a direct sensor 102 to control an amount of conveyance. In the same manner, in succession a detection pattern 1003a is printed in the area #0, a detection pattern 1003b in the area #2, a detection pattern 1002a in the area #1, a detection pattern 1002b in the area #3, a detection pattern 1001b in the area #2, and a detection pattern 1001c in the area #0. Control of an amount of conveyance is performed accordingly.

As described above, by dividing the detection pattern area 104 into a plurality of areas to print detection patterns, it is possible to obtain a printing result in which a detection pattern is less likely to be viewed.

Fifth Embodiment

In the above embodiments, descriptions have been given of the example of printing detection patterns with a single ink on the surface of the sheet S. Detection patterns may be printed with a plurality of ink colors. In a fifth embodiment of the present invention, a plurality of ink colors are used to obtain a printing result in which a detection pattern is less likely to be viewed.

Figure 16:
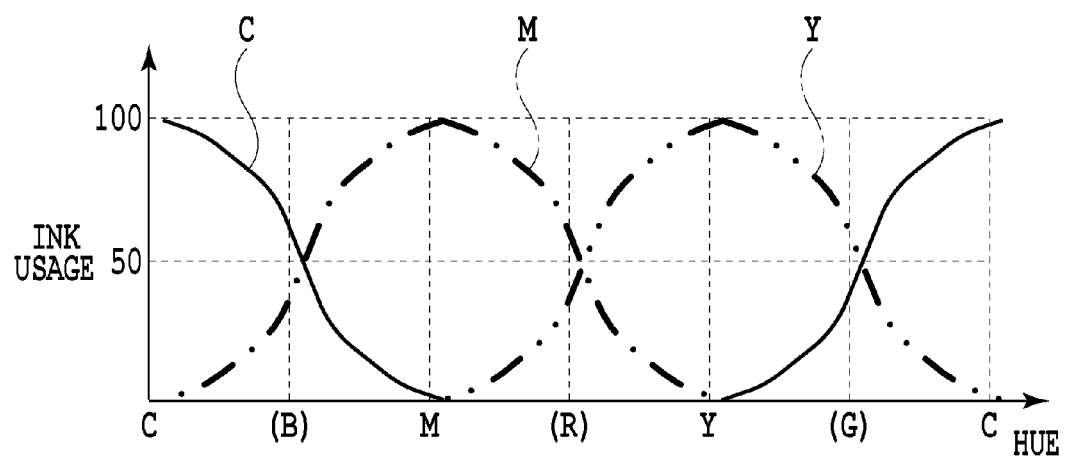
FIG. 16 is a view showing a hue and exemplary usages of inks representing the hue.
Figure 17:
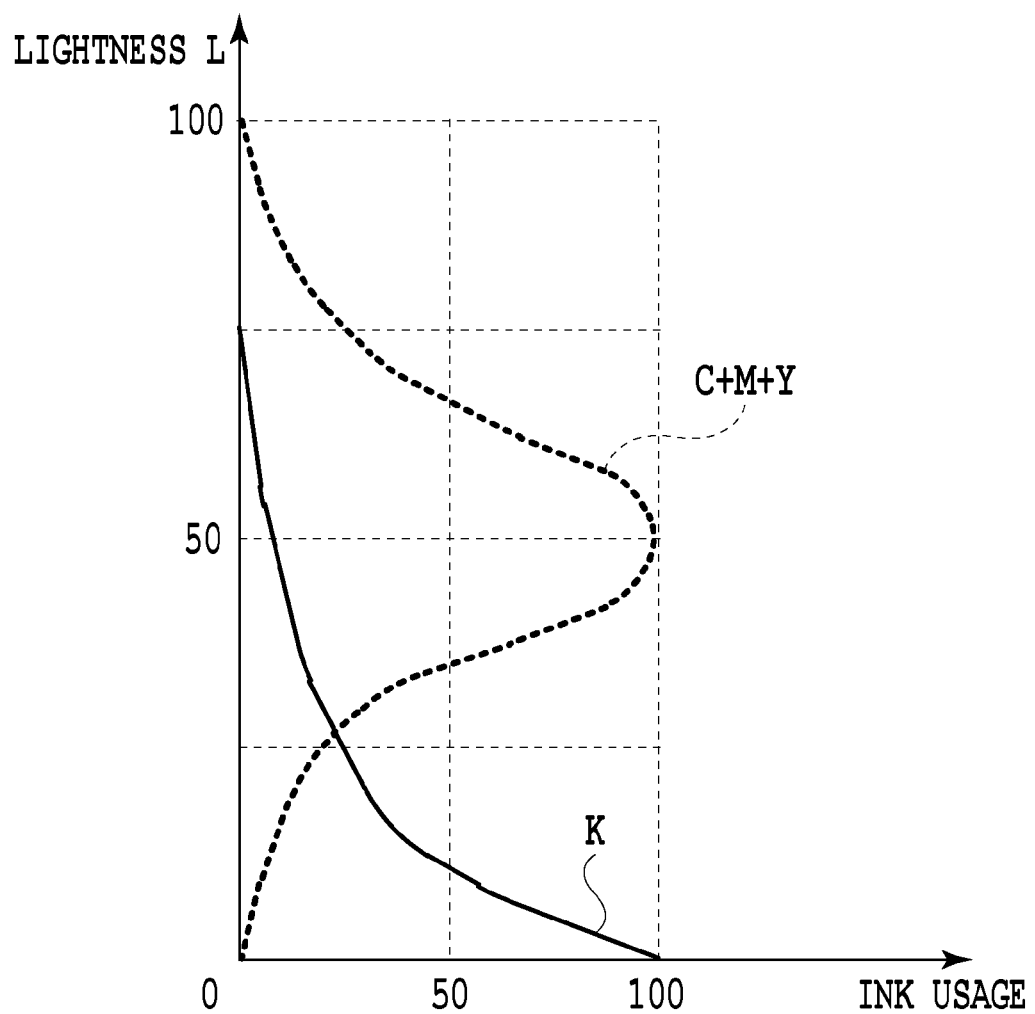
FIG. 17 is a view showing lightness and exemplary usages of inks representing the lightness.

FIG. 16 is a graph showing a hue and exemplary usages of inks representing the hue. FIG. 17 is a graph showing lightness and exemplary usages of inks representing the lightness. In the present embodiment, four inks are used: C (cyan), M (magenta), Y (yellow), and K (black).

In FIG. 16, a horizontal axis shows a hue angle in a range of 0° to 360(0°) with the hue of C being set as a reference 0° and a vertical axis shows a usage of ink. Note that K ink is omitted. Regarding a usage of each ink, C ink is shown by a solid line, M ink by alternate long and short lines, and Y ink by a chain double-dashed line. It is indicated that C ink is used mainly in a range of 0° to 60° and 300° to 360(0°), M ink in a range of 60° to 180°, and Y ink 180° to 300°. In FIG. 17, a horizontal axis shows a usage of ink and a vertical axis shows lightness (L). Originally, usages of C, M, and Y inks change in a hue direction, but the hue direction is omitted, and a total usage of C, M, and Y inks is shown by a broken line and a usage of K ink is shown by a solid line. If lightness is low (dark), the usage of the K ink increases. The usage of C, M, and Y inks increases in an intermediate lightness. If lightness is high, the usages of all inks decrease. Based on the characteristics of ink usages shown in FIGS. 16 and 17, the K ink is more likely to be used for a color having a lightness lower than 50. The C, M, and Y inks are more likely to be used for a color having a lightness higher than 50 in the respective hue angles when dividing the hue direction into three hue ranges which have hues of C, M, and Y as the center of each range respectively.

Figure 18:
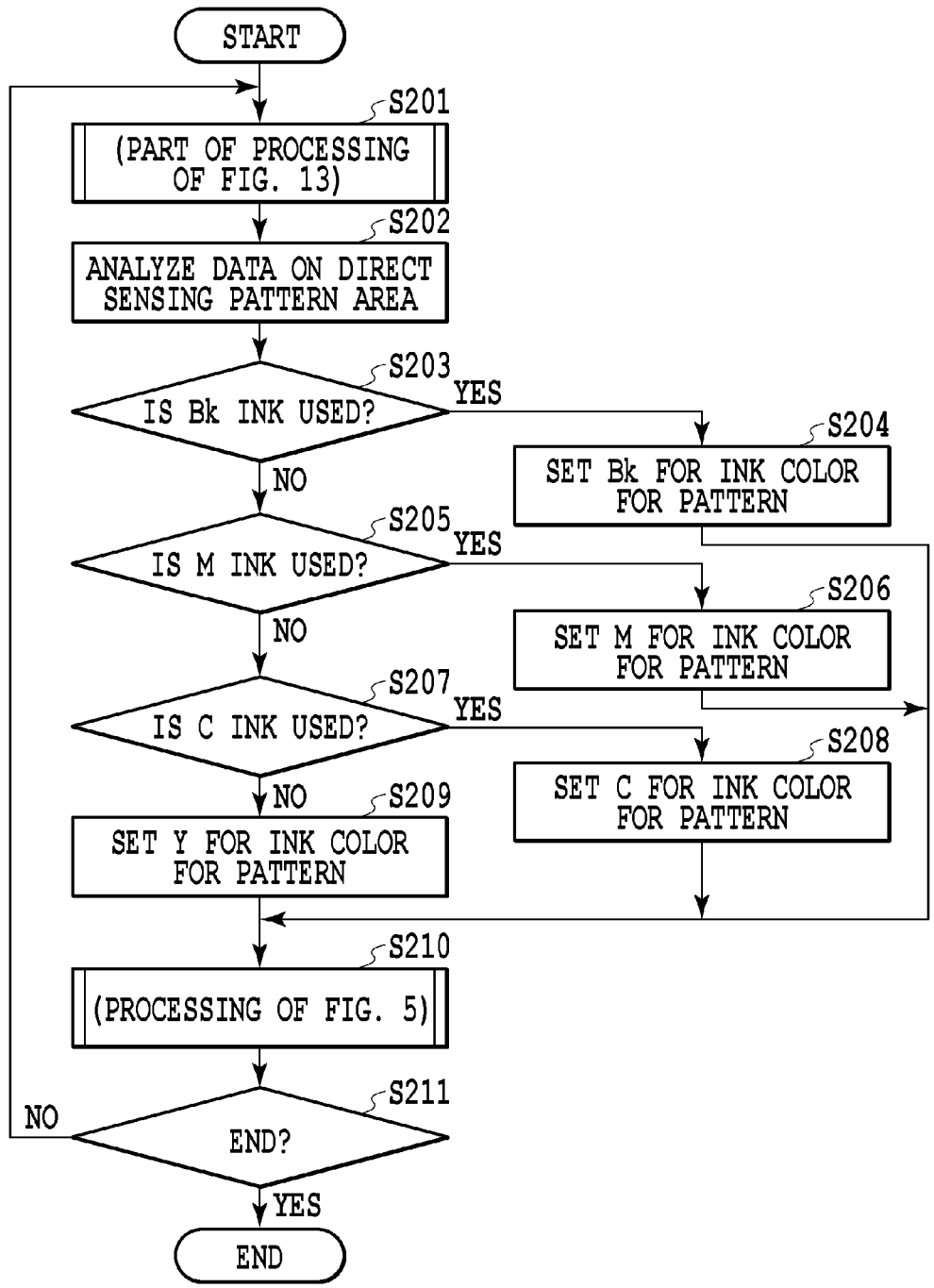
FIG. 18 is a flowchart showing conveyance amount control based on direct sensing processing and the processing result thereof according to a fifth embodiment of the present invention.

FIG. 18 is a flowchart showing direct sensing processing and a conveyance amount control based on direct sensing processing according to the fifth embodiment of the present invention, which uses the above-described ink usage characteristics.

In FIG. 18, first in step S201, determination on in which area of a detection pattern area 104, a detection pattern is printed and selection of a detection pattern to be used as described in the fourth embodiment described with reference to FIG. 13. In step S202, of the image data to be printed, a hue and lightness are obtained based on image data printed in the area of the detection pattern area 104 determined in step S201 (data analysis). In step S203, if the lightness obtained in step S202 is 50 or lower, the process proceeds to step S204, and it is determined that an ink color used for the detection pattern is K (achromatic color) (ink color selection). If the lightness is higher than 50, the process proceeds to step S205.

In step S205, if the hue angle calculated in step S202 satisfies 60≤hue<180, the process proceeds to step S206, and it is determined that an ink color used for the detection pattern is M (chromatic color). If not, the process proceeds to step S207. In step S207, if the hue angle calculated in step S202 satisfies 180≤hue<300, the process proceeds to step S206, and it is determined that an ink color used for the detection pattern is Y. If not, the process proceeds to step S209. In step S209, it is determined that an ink color used for the detection pattern is C, and the process proceeds to step S210.

In step S210, as described above in the first embodiment with reference to FIG. 5, a detection pattern is printed and read, and image data is printed while an amount of conveyance is controlled. In step S211, the above processing is repeated until a print job is finished. Further, if the lightness calculated in step S202 is 95 or higher (equal to or higher than a predetermined value), image data is very light. If an ink amount used actually for printing is small, processing is performed in which an ink color used for the detection pattern is determined to be Y (S209).

Figure 19:
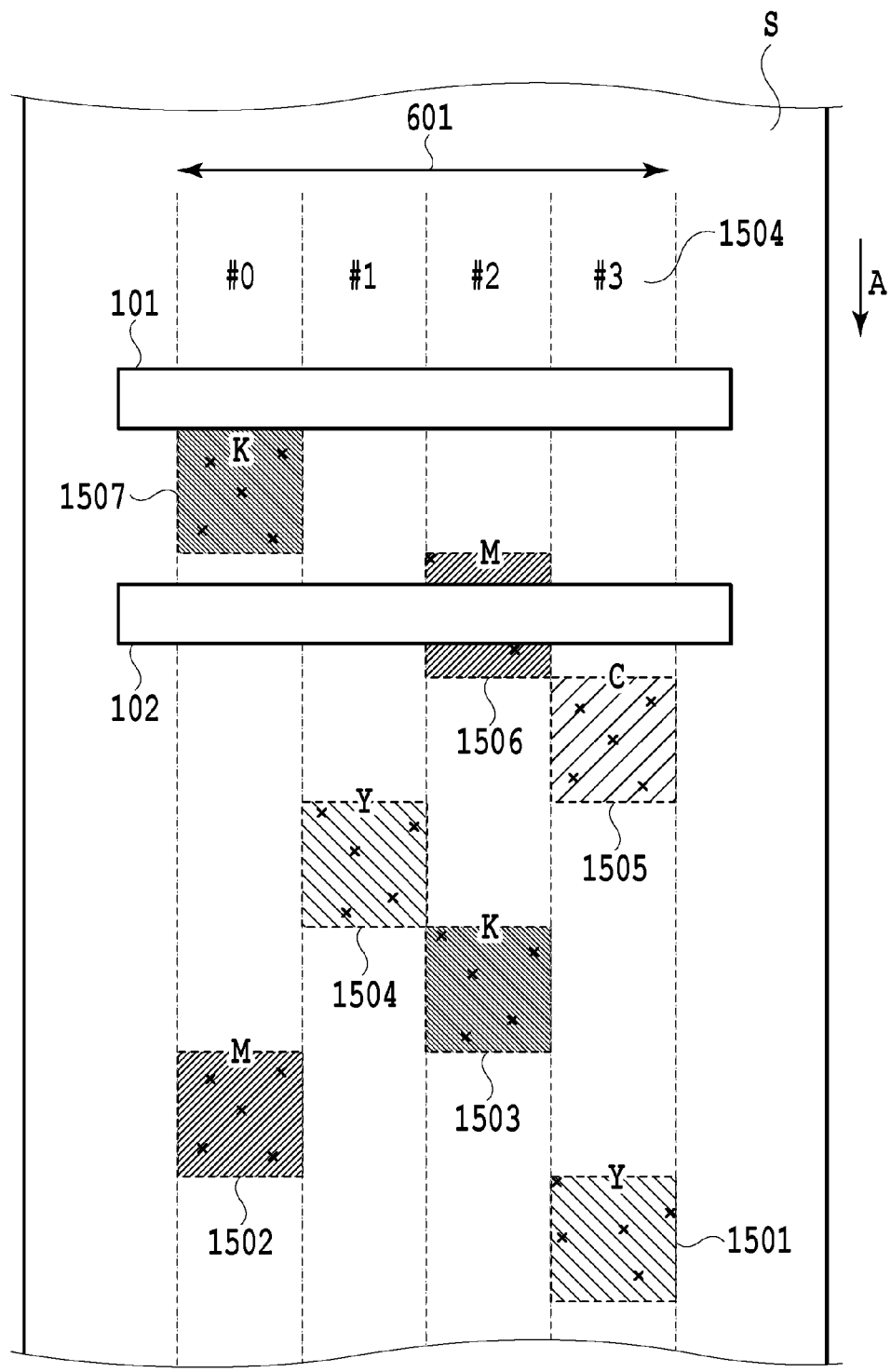
FIG. 19 is a view showing printing results of detection patterns according to the fifth embodiment.

FIG. 19 is a view showing printing results of detection patterns according to the present embodiment. In the example shown in FIG. 19, a detection pattern is first printed in an area 1501 with Y, then in an area 1502 with M, and in an area 1503 with K. The method for selecting an area in which a detection pattern is printed is the same as the one used in the fourth embodiment.

It should be noted that the use frequency of each ink is counted, and if the count of use frequency of one ink is double the count of use frequency of another ink, for example, in step S204, an ink color having the lowest count of use frequency is used for the detection pattern. In an area in which lightness is low, a detection pattern is less conspicuous if any ink color is used. This characteristic is utilized to equalize use frequencies between the inks, or the print heads. As described above, the number of uses of an ink for printing a detection pattern is stored for each ink color in a selection number storage memory, and if lightness of the detection pattern is equal to or lower than a predetermined level, an ink of the smallest number of uses is selected based on a storage result in the selection number storage memory.

Other Embodiment

In the above-described first to fifth embodiments, descriptions have been given of the example of generating print data on a detection pattern by using a dither matrix apart from print data for printing an image. However, dots that can be used for a detection pattern may be extracted from print data on an image to be printed and printed by a direct sensing print head 101, and based on the detection result, an amount of conveyance may be controlled. That is, from the relation between image data and a dither pattern, it is possible to know how dots are printed on a sheet. From pixels on which the dots are printed, pixel dots that can be used for a detection pattern may be extracted and printed by the direct sensing print head 101. The dots used for the detection pattern should not be printed by a print head 14 used for printing an image. At this time, if there is a shortage of dots needed for printing the detection pattern, generating a detection pattern by the methods described above in the embodiments can solve the shortage even if there are pixels that do not have print data on an image.

Still Further Embodiment

The printing systems of the above-described embodiments use a line-type print head having nozzles arranged corresponding to the width of a print medium conveyed. The application of the present invention is not limited to this system. For example, a serial type may be used in which scanning of a print medium is performed by a print head, and ink is ejected from nozzles during the scanning.

Furthermore, control based on direct sensing is not limited to conveyance control. For example, print control of a printing timing or the like may be performed based on a measurement result of a detection pattern.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-154963, filed Jul. 30, 2014, which is hereby incorporated by reference wherein in its entirety.

What is claimed is:

1. A printing apparatus that conveys a print medium and performs printing on the conveyed print medium, the printing apparatus comprising:
   a processor and a memory;
   a print data generation unit configured to generate print data by quantizing image data to be printed in which predetermined pseudo halftone processing of the image data is performed;
   a pattern data generation unit configured to generate print data of a detection pattern by quantizing data of the detection pattern in which the same predetermined pseudo halftone processing of the data on the detection pattern is performed;
   a pattern printing unit configured to print a detection pattern based on the generated print data of the detection pattern;
   a measuring unit configured to measure the printed detection pattern, the measuring unit being placed downstream of the pattern printing unit in a conveying direction of the print medium;
   an image printing unit configured to print an image based on the print data of the image data that is generated by the print data generating unit, the image printing unit being placed downstream of the measuring unit in the conveying direction of the print medium; and
   a print control unit configured to control printing by the image printing unit based on a measurement result of the detection pattern by the measuring unit,
   wherein the print data generation unit, the pattern data generation unit, the pattern printing unit, the measuring unit, the image printing unit and the print control unit are implemented at least in part by the processor and the memory.

2. The printing apparatus according to claim 1, wherein the print control unit further controls conveyance of the print medium.

3. The printing apparatus according to claim 1, wherein the predetermined pseudo halftone processing is dither processing.

4. The printing apparatus according to claim 1, wherein the predetermined pseudo halftone processing is processing for performing quantization for data of a plurality of pixels in an area of a predetermined size according to values of the pixels, and through the predetermined pseudo halftone processing, the print data resulting from the quantization of the image data and the print data resulting from quantization of the data on the detection pattern are generated as print data on different pixels from each other.

5. The printing apparatus according to claim 1, wherein the predetermined pseudo halftone processing is processing for performing quantization on data of a plurality of pixels in an area of a predetermined size according to values of the pixels, and through the predetermined pseudo halftone processing, pixels for the print data resulting from the quantization of the data for the detection pattern are the same as part of pixels for the print data resulting from the quantization of the image data.

6. The printing apparatus according to claim 1, wherein the print data generation unit does not generate print data for a pixel for which print data has been generated by the pattern data generation unit.

7. The printing apparatus according to claim 1, wherein the pattern printing unit selects from a plurality of divided areas obtained by dividing an area in which the detection pattern is to be printed on the print medium such that use frequencies of the divided areas are equalized, to print the detection pattern on the selected divided area.

8. The printing apparatus according to claim 1, further comprising:
a data analysis unit configured to analyze the print data of the detection pattern; and
an ink color selection unit configured to select an ink for printing the detection pattern based on a result of the analysis,
wherein the pattern printing unit prints the detection pattern by using the selected ink,
in a result of the analysis, in a case where lightness of the detection pattern is lower than a predetermined level, the ink color selection unit selects an ink of an achromatic color, and if not, the ink color selection unit selects an ink of a chromatic color, and
in a case where an ink of a chromatic color is selected, the ink color selection unit selects an ink of a chromatic color that has a hue angle closest to a hue angle of the detection pattern in the result of the analysis.

9. The printing apparatus according to claim 8, wherein the ink color selection unit selects a Y ink in a case where the lightness of the detection pattern is equal to or higher than the predetermined level in the result of the analysis.

10. The printing apparatus according to claim 9, further comprising a selection number storage unit configured to store, for each ink color, the number of times ink for printing the detection pattern is selected,
wherein in a case where the lightness of the detection pattern is equal to or lower than the predetermined level in the result of the analysis, the ink color selection unit selects an ink of the smallest number of selection based on a storage result in the selection number storage unit.

11. The printing apparatus according to claim 1, wherein the generated print data of the detection pattern is data of dispersed pixels in an area of print data for which the pseudo halftone processing is performed.

12. A print control method of a printing apparatus that conveys a print medium and performs printing on the conveyed print medium, the print control method comprising:
a print data generation step of generating print data by quantizing image data to be printed in which predetermined pseudo halftone processing of the image data is performed;
a pattern data generation step of generating print data of a detection pattern by quantizing data of the detection pattern in which the same predetermined pseudo halftone processing of the data of the detection pattern is performed;
a pattern printing step of printing, by a pattern printing unit, a detection pattern based on the generated print data of the detection pattern;
a measuring step of measuring the printed detection pattern, the measuring step being performed by a measuring unit placed downstream of the pattern printing unit in a conveying direction of the print medium;
an image printing step of printing an image based on the print data of the image data that is generated by the print data generating step, the image printing step being performed by an image printing unit placed downstream of the measuring unit in the conveying direction of the print medium; and
a print control step of controlling printing by the image printing step, based on a measurement result of the detection pattern by the measuring step.

* * * * *